United States Patent
Koch et al.

(10) Patent No.: US 10,360,517 B2
(45) Date of Patent: Jul. 23, 2019

(54) DISTRIBUTED HYPERPARAMETER TUNING SYSTEM FOR MACHINE LEARNING

(71) Applicant: SAS Institute Inc., Cary, NC (US)

(72) Inventors: Patrick Nathan Koch, Morrisville, NC (US); Brett Alan Wujek, Cary, NC (US); Oleg Borisovich Golovidov, Raleigh, NC (US); Steven Joseph Gardner, Cary, NC (US); Joshua David Griffin, Harrisburg, NC (US); Scott Russell Pope, Raleigh, NC (US); Yan Xu, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 41 days.

(21) Appl. No.: 15/822,462

(22) Filed: Nov. 27, 2017

(65) Prior Publication Data
US 2018/0240041 A1    Aug. 23, 2018

Related U.S. Application Data

(60) Provisional application No. 62/462,312, filed on Feb. 22, 2017, provisional application No. 62/476,399, filed on Mar. 24, 2017.

(51) Int. Cl.
*G06N 20/00* (2019.01)
*G06F 16/2457* (2019.01)
(Continued)

(52) U.S. Cl.
CPC ....... *G06N 20/00* (2019.01); *G06F 16/24578* (2019.01); *G06N 3/08* (2013.01);
(Continued)

(58) Field of Classification Search
None
See application file for complete search history.

(56) References Cited

U.S. PATENT DOCUMENTS

| 9,390,370 B2 | 7/2016 | Kingsbury |
| 2017/0132528 A1* | 5/2017 | Aslan ................... G06N 99/005 |

OTHER PUBLICATIONS

Raschka "Model evaluation, model selection, and algorithm selection in machine learning Part III—Cross-validation and hyperparameter tuning", 2016, pp. 24 https://sebastianraschka.com/blog/2016/model-evaluation-selection-part3.html.*

(Continued)

*Primary Examiner* — Li Wu Chang
(74) *Attorney, Agent, or Firm* — Bell & Manning, LLC

(57) ABSTRACT

A computing device automatically selects hyperparameter values based on objective criteria to train a predictive model. Each session of a plurality of sessions executes training and scoring of a model type using an input dataset in parallel with other sessions of the plurality of sessions. Unique hyperparameter configurations are determined using a search method and assigned to each session. For each session of the plurality of sessions, training of a model of the model type is requested using a training dataset and the assigned hyperparameter configuration, scoring of the trained model using a validation dataset and the assigned hyperparameter configuration is requested to compute an objective function value, and the received objective function value and the assigned hyperparameter configuration are stored. A best hyperparameter configuration is identified based on an extreme value of the stored objective function values.

30 Claims, 22 Drawing Sheets

(51) Int. Cl.
G06N 3/08 (2006.01)
G06N 3/12 (2006.01)
G06N 5/00 (2006.01)
G06N 20/10 (2019.01)

(52) U.S. Cl.
CPC ............. *G06N 3/126* (2013.01); *G06N 5/003* (2013.01); *G06N 20/10* (2019.01)

(56) References Cited

OTHER PUBLICATIONS

Dewancker et al., A Stratified Analysis of Bayesian Optimization Methods, arXiv:1603.09441v1 [cs.LG], Mar. 31, 2016.
Wujek et al., Best Practices for Machine Learning Applications, Available Jun. 26, 2017, pp. 1-21.
Gomes et al., Combining Meta-Learning and Search Techniques to Select Parameters for Support Vector Machines, Neurocomputing, Mar. 18, 2011.
Sacks et al., Design and Analysis of Computer Experiments, Statistical Science, vol. 4, No. 4, Nov. 1989, pp. 409-423.
Lorena et al., Evolutionary Tuning of SVM Parameter Values in Multiclass Problems, Neurocomputing 71, Jul. 16, 2008, pp. 3326-3334.
M. McKay, Latin Hypercube Sampling as a Tool in Uncertainty Analysis of Computer Models, In Proceedings of the 1992 Winter Simulation Conference, edited by J. J. Swain et al., 1992, pp. 557-564.
Sutskever et al., On the importance of initialization and momentum in deep learning, Proceedings of the 30th International Conference on Machine Learning, Atlanta, Georgia, 2013.
Bottou et al., Optimization Methods for Large-Scale Machine Learning, arXiv:1606.04838v2 [stat.ML], Jun. 15, 2016.
Renukadevi et al., Performance Analysis of Optimization Techniques for Medical Image Retrieval, Journal of Theoretical and Applied Information Technology, vol. 59, No. 2, Jan. 20, 2014, pp. 390-399.
Bergstra et al., Random Search for Hyper-parameter Optimization, Journal of Machine Learning Research 13, Feb. 2012, pp. 281-305.
D. Wolpert, The Lack of a Priori Distinctions Between Learning Algorithms, Neural Computation 8,, 1996, pp. 1341-1390.
LeCun et al., The MNIST Database of Handwritten Digits, http://yann.lecun.com/exdb/mnist/, Accessed Apr. 8, 2016.
Konen et al., Tuned Data Mining: A Benchmark Study on Different Tuners, In Proceedings of the 13th Annual Conference on Genetic and Evolutionary Computation, Jul. 12, 2011, pp. 1995-2002.
Auto-WEKA, Available Jun. 5, 2017.
Weka (machine learning), Available Mar. 22, 2017.
Hyperopt, Available Jun. 9, 2017.
LIBSVM—A Library for Support Vector Machines, https://www.csie.ntu.edu.tw/~cjlin/libsvm/, Available Jun. 5, 2017.
LIBSVM—Wikipedia, https://en.wikipedia.org/wiki/LIBSVM, Available Apr. 10, 2017.
GitHub—mlr-org/mlr: mlr: Machine Learning in R, https://github.com/mlr-org/mlr?_sm_au_=iVV31J5w7f4vfk5N, Available Jun. 9, 2017.
R (programming language)—Wikipedia, https://en.wikipedia.org/wiki/R_(programming_language), Available Jun. 8, 2017.
MOE, Available Jun. 9, 2017.
3.2. Tuning the hyper-parameters of an estimator, Available Jun. 9, 2017.
Sklearn.grid_search.RandomizedSearchCV, Available Jun. 9, 2017.
Scikit-learn, https://en.wikipedia.org/w/index.php?title=Scikit-oldid=778660797, Available May 4, 2017.
About SigOpt, Available Jun. 9, 2017.
Spearmint, Available Jun. 9, 2017.
SUMO—SUrrogate MOdeling Lab, Available Jun. 5, 2017.
Surrogate model, https://en.wikipedia.org/w/index.php?title=Surrogate_model&oldid=772207388, Available Mar. 25, 2017.
TPOT, Available Jun. 5, 2017.
SAS Institute Inc. 2016. SAS/OR® 14.2 User's Guide: Local Search Optimization. Cary, NC: SAS Institute Inc., Nov. 2016.
Gray et al., Hybrid Optimization Schemes for Simulation-Based Problems, Procedia Computer Science 1, 2012, pp. 1349-1357.
Gray, G. A., and Fowler, K. R. (2011). "The Effectiveness of Derivative-Free Hybrid Methods for Black-Box Optimization." International Journal of Mathematical Modeling and Numerical Optimization 2:112-133.
Gray, G. A., and Kolda, T. G. (2006). "Algorithm 856: APPSPACK 4.0—Asynchronous Parallel Pattern Search for Derivative-Free Optimization." ACM Transactions on Mathematical Software 32:485-507.
Griffin, J. D., Fowler, K. R., Gray, G. A., and Hemker, T. (2011). "Derivative-Free Optimization via Evolutionary Algorithms Guiding Local Search (EAGLS) for MINLP." Pacific Journal of Optimization 7:425-443.
Griffin, J. D., and Kolda, T. G. (2010a). "Asynchronous Parallel Hybrid Optimization Combining DIRECT and GSS." Optimization Methods and Software 25:797-817.
Griffin, J. D., and Kolda, T. G. (2010b). "Nonlinearly Constrained Optimization Using Heuristic Penalty Methods and Asynchronous Parallel Generating Set Search." Applied Mathematics Research Express 2010:36-62.
Griffin, J. D., Kolda, T. G., and Lewis, R. M. (2008). "Asynchronous Parallel Generating Set Search for Linearly Constrained Optimization." SIAM Journal on Scientific Computing 30:1892-1924.
Kolda, T. G., Lewis, R. M., and Torczon, V. (2003). "Optimization by Direct Search: New Perspectives on Some Classical and Modern Methods." SIAM Review 45:385-482.
Taddy, M. A., Lee, H. K. H., Gray, G. A., and Griffin, J. D. (2009). "Bayesian Guided Pattern Search for Robust Local Optimization." Technometrics 51:389-401.
Plantenga, T. (2009). HOPSACK 2.0 User Manual (v 2.0.2). Technical report, Sandia National Laboratories.
SAS Institute Inc. 2017. SAS® Visual Data Mining and Machine Learning 8.1: Programming Guide. Cary, NC: SAS Institute Inc., Mar. 2017.
SAS Institute Inc. 2017. SAS® Visual Data Mining and Machine Learning 8.1: Data Mining and Machine Learning Procedures. Cary, NC: SAS Institute Inc., Mar. 2017.

* cited by examiner

Tuner Results
Default and Best Configurations

| Evaluation | Number of Trees | Number of Variables to Try | Learning Rate | Sampling Rate | Lasso | Ridge | Misclassification Error Percentage |
|---|---|---|---|---|---|---|---|
| 0 | 100 | 719 | 0.100000 | 0.500000 | 0 | 0 | 2.57 |
| 2551 | 142 | 317 | 0.191654 | 1.000000 | 0.138831 | 0.229582 | 1.74 |
| 2540 | 136 | 375 | 0.212759 | 0.993648 | 0 | 0 | 1.78 |
| 2391 | 136 | 372 | 0.225386 | 0.800160 | 0.269248 | 0.135010 | 1.80 |
| 1970 | 138 | 358 | 0.228028 | 0.782591 | 0.101194 | 0 | 1.84 |
| 1899 | 142 | 404 | 0.292864 | 0.782425 | 0.125639 | 2.795894 | 1.85 |
| 2197 | 142 | 349 | 0.210434 | 0.749697 | 0.250103 | 1.757830 | 1.85 |
| 1441 | 161 | 285 | 0.222495 | 0.787490 | 1.113479 | 6.411795 | 1.86 |
| 1754 | 141 | 339 | 0.217505 | 1.000000 | 0 | 0.781732 | 1.86 |
| 1897 | 146 | 371 | 0.277068 | 0.827520 | 0.147782 | 2.673040 | 1.86 |
| 2477 | 146 | 302 | 0.202651 | 0.993250 | 0.349283 | 1.009834 | 1.88 |

| | |
|---|---|
| Initial Configuration Objective Value | 2.5700 |
| Best Configuration Objective Value | 1.7400 |
| Worst Configuration Objective Value | 24.7200 |
| Initial Configuration Evaluation Time in Seconds | 1292.92 |
| Best Configuration Evaluation Time in Seconds | 1087.17 |
| Number of Improved Configurations | 18 |
| Number of Evaluated Configurations | 2555 |
| Total Tuning Time in Seconds | 101823 |
| Parallel Tuning Speedup | 26.8910 |

FIG. 14

| Task | Seconds | Percent |
|---|---|---|
| Model Training | 2700131 | 98.88 |
| Model Scoring | 28018.80 | 1.02 |
| Total Objective Evaluations | 2737150 | 100.00 |
| Tuner | 26.84 | 0.00 |
| Total CPU Time | 2737177 | 100.00 |

FIG. 15

DISTRIBUTED HYPERPARAMETER TUNING SYSTEM FOR MACHINE LEARNING

CROSS-REFERENCE TO RELATED APPLICATIONS

The present application claims the benefit of 35 U.S.C. § 119(e) to U.S. Provisional Patent Application No. 62/462,312 filed Feb. 22, 2017 and to U.S. Provisional Patent Application No. 62/476,399 filed Mar. 24, 2017, the entire contents of which are hereby incorporated by reference.

BACKGROUND

Machine learning is a form of self-calibration of predictive models that are built from training data and commonly used to find hidden value in big data. Facilitating effective decision making requires the transformation of relevant data to high-quality descriptive and predictive models. The transformation presents several challenges however. For example, a neural network type predictive model generates predicted outputs by transforming a set of inputs through a series of hidden layers that are defined by activation functions linked with weights. Determining the activation functions and the weights to determine the best model configuration is a complex optimization problem.

The activation functions and the weights, among other parameters, are referred to herein as "hyperparameters" that are defined by a user to control determination of a predictive model using various model types such as the neural network model type, a gradient boosting tree model type, a decision tree model type, a forest model type, and a support vector machine model type. Different hyperparameters are used based on the type of predictive model. Though the predictive model solutions are governed by the hyperparameters, there are typically no clear default values for the hyperparameters that generate a satisfactory predictive model for a wide range of applications. For example, a depth of a decision tree model type, a number of trees in a forest model type, a number of hidden layers and neurons in each layer in a neural network model type, and a degree of regularization to prevent overfitting are a few examples of quantities that are provided as inputs to train a predictive model. Not only do the input values used for the hyperparameters dictate the performance of the training process, but more importantly they govern the quality of the resulting predictive models.

The approach to finding the ideal values for hyperparameters (tuning a predictive model type to a particular dataset) has traditionally been a manual effort. For guidance in setting these values, researchers often rely on their past experience using these machine learning algorithms to train models. However, even with expertise in machine learning algorithms and their hyperparameters, the best values of these hyperparameters changes with different data. As a result, it is difficult to define the hyperparameter values based on previous experience. However, there is an inherent expense in training numerous candidate models to evaluate various values and combinations of values for the hyperparameters in terms of computing resources, computing time, and user time.

SUMMARY

In an example embodiment, a non-transitory computer-readable medium is provided having stored thereon computer-readable instructions that when executed by a computing device, cause the computing device to automatically select hyperparameter values based on objective criteria for training a predictive model. A plurality of tuning evaluation parameters that include a model type, a search method type, and values to evaluate for each hyperparameter of a plurality of hyperparameters associated with the model type are accessed. A number of session computing devices allocated to each session of a plurality of sessions is determined. Each session computing device of the number of session computing devices processes a subset of an input dataset. A number of the plurality of sessions is determined. Each session of the plurality of sessions executes training and scoring of the model type using the input dataset in parallel with other sessions of the plurality of sessions. A plurality of hyperparameter configurations is determined using a search method of the search method type. A hyperparameter configuration includes a value for each hyperparameter of the plurality of hyperparameters. Each hyperparameter configuration of the plurality of hyperparameter configurations is unique. For each session of the plurality of sessions, a hyperparameter configuration is assigned to the session of the plurality of sessions, training of a model of the model type by the session computing devices allocated to the session is requested; scoring of the trained model by the session computing devices allocated to the session is requested to compute an objective function value, the computed objective function value is received when the requested scoring is complete, and the received objective function value and the assigned hyperparameter configuration are stored. The model is trained using the assigned hyperparameter configuration and a training dataset that is a first portion of the input dataset. The trained model is scored using the assigned hyperparameter configuration and a validation dataset that is a second portion of the input dataset. A best hyperparameter configuration is identified based on an extreme value of the stored objective function values. The identified best hyperparameter configuration is output.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to automatically select hyperparameter values based on objective criteria for training a predictive model.

In yet another example embodiment, a method of automatically selecting hyperparameter values based on objective criteria for training a predictive model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 12 depicts a table of hyperparameter results for a gradient boosting tree predictive model computed by the hyperparameter selection system of FIG. 1 in accordance with an illustrative embodiment.

FIG. 14 shows a performance summary for the gradient boosting tree predictive model computed by the hyperparameter selection system of FIG. 1 in accordance with an illustrative embodiment.

FIG. 15 shows a computation time summary for the gradient boosting tree predictive model computed by the hyperparameter selection system of FIG. 1 in accordance with an illustrative embodiment.

DETAILED DESCRIPTION

Figure 1:
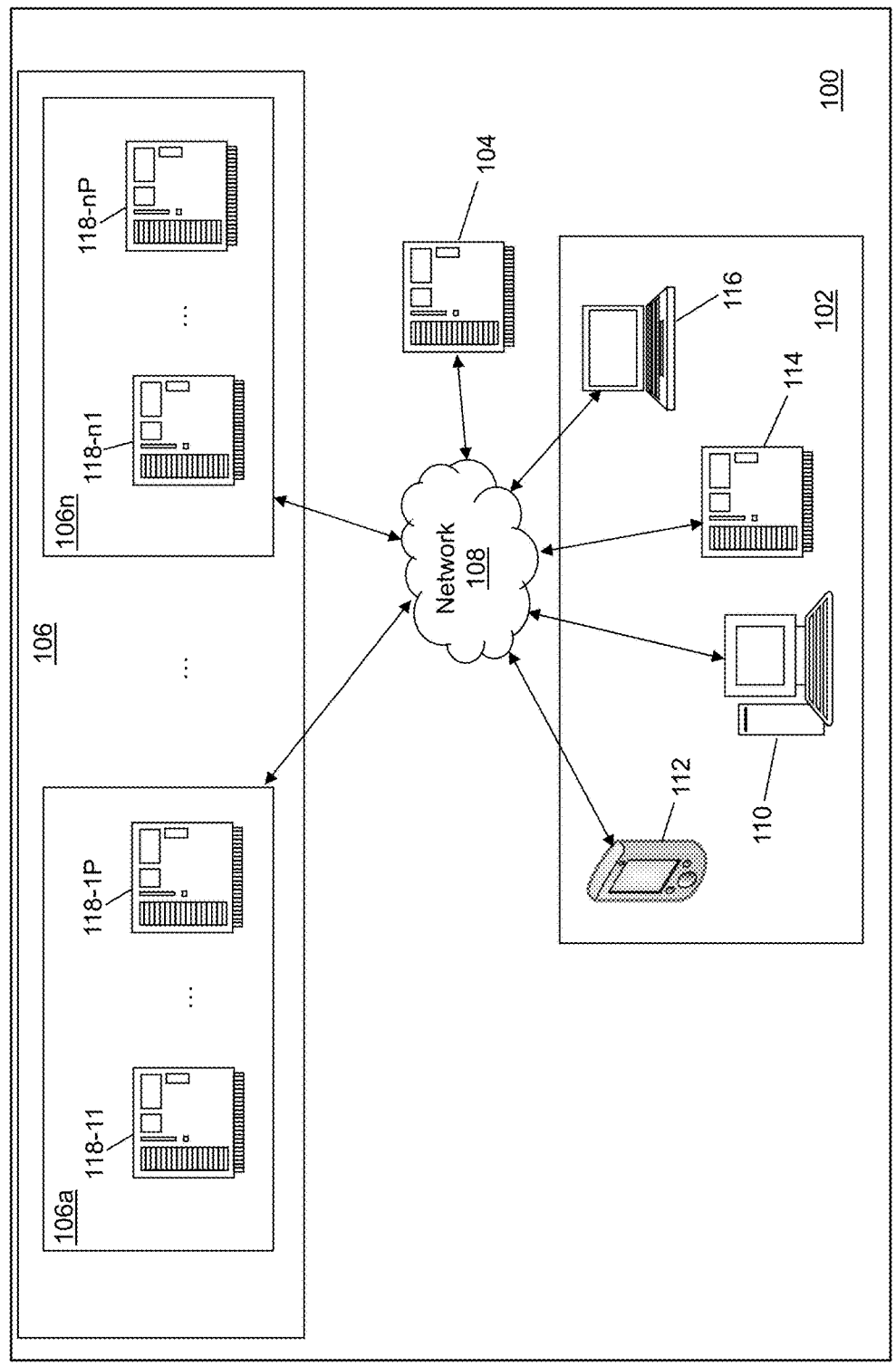
FIG. 1 depicts a block diagram of a hyperparameter selection system in accordance with an illustrative embodiment.

Referring to FIG. 1, a block diagram of a hyperparameter selection system 100 is shown in accordance with an illustrative embodiment. In an illustrative embodiment, hyperparameter selection system 100 may include a user system 102, a selection manager device 104, a worker system 106, and a network 108. Each of user system 102, selection manager device 104, and worker system 106 may be composed of one or more discrete computing devices in communication through network 108. Alternatively, user system 102, selection manager device 104, and worker system 106 may be integrated into a single computing device capable of computing using a plurality of different threads.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from selection manager device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
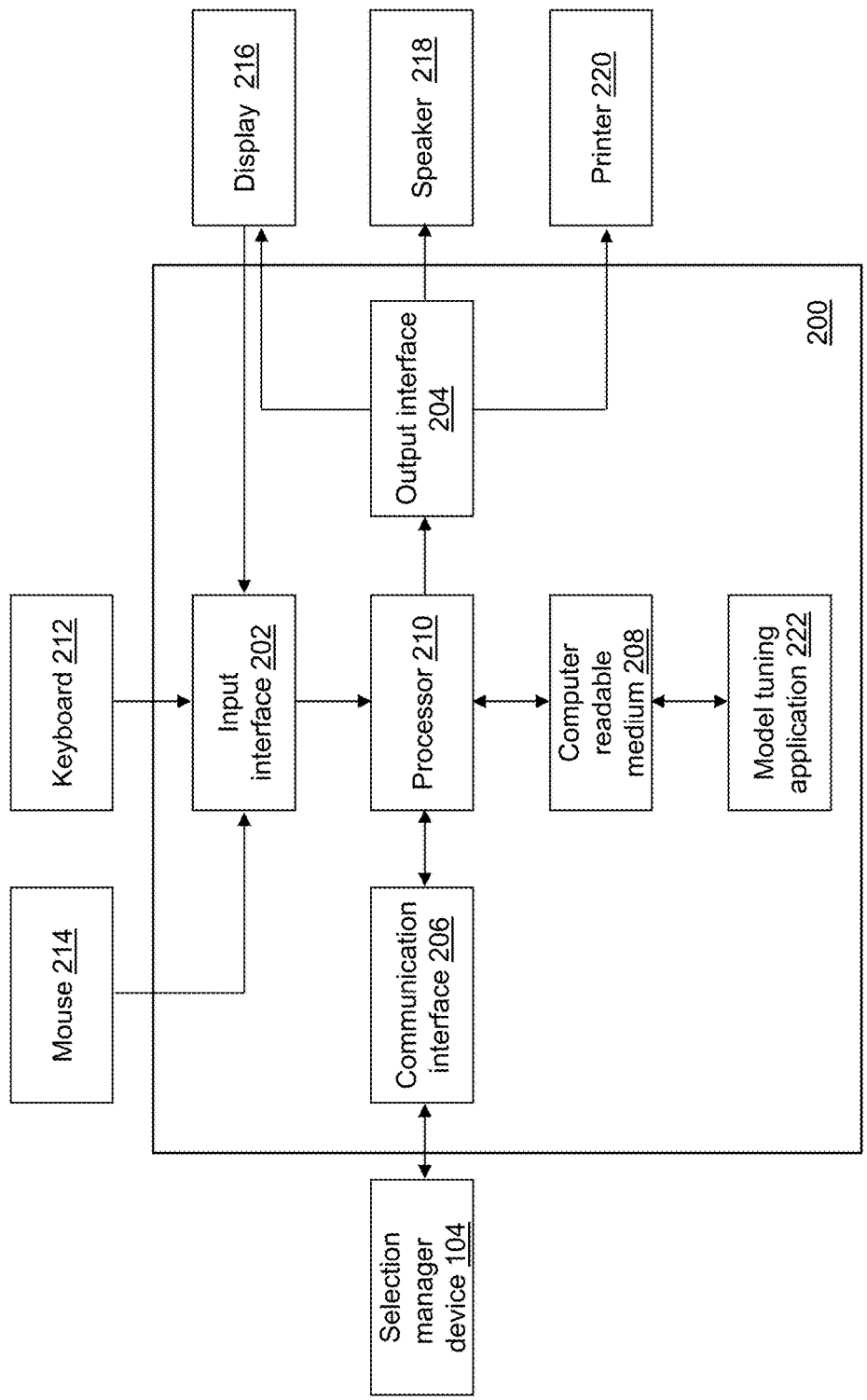
FIG. 2 depicts a block diagram of a user device of the hyperparameter selection system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a computer-readable medium 208, a processor 210, and a model tuning application 222. Each computing device of user system 102 may be executing model tuning application 222 of the same or different type.

Referring again to FIG. 1, selection manager device 104 can include any form factor of computing device. For illustration, FIG. 1 represents selection manager device 104 as a server computer. Selection manager device 104 may send and receive signals through network 108 to/from user system 102 and/or to/from worker system 106. Selection manager device 104 may communicate using various transmission media that may be wired and/or wireless as understood by those skilled in the art. Selection manager device 104 may be implemented on a plurality of computing devices of the same or different type. Hyperparameter selection system 100 further may include a plurality of selection manager devices.

Figure 3:
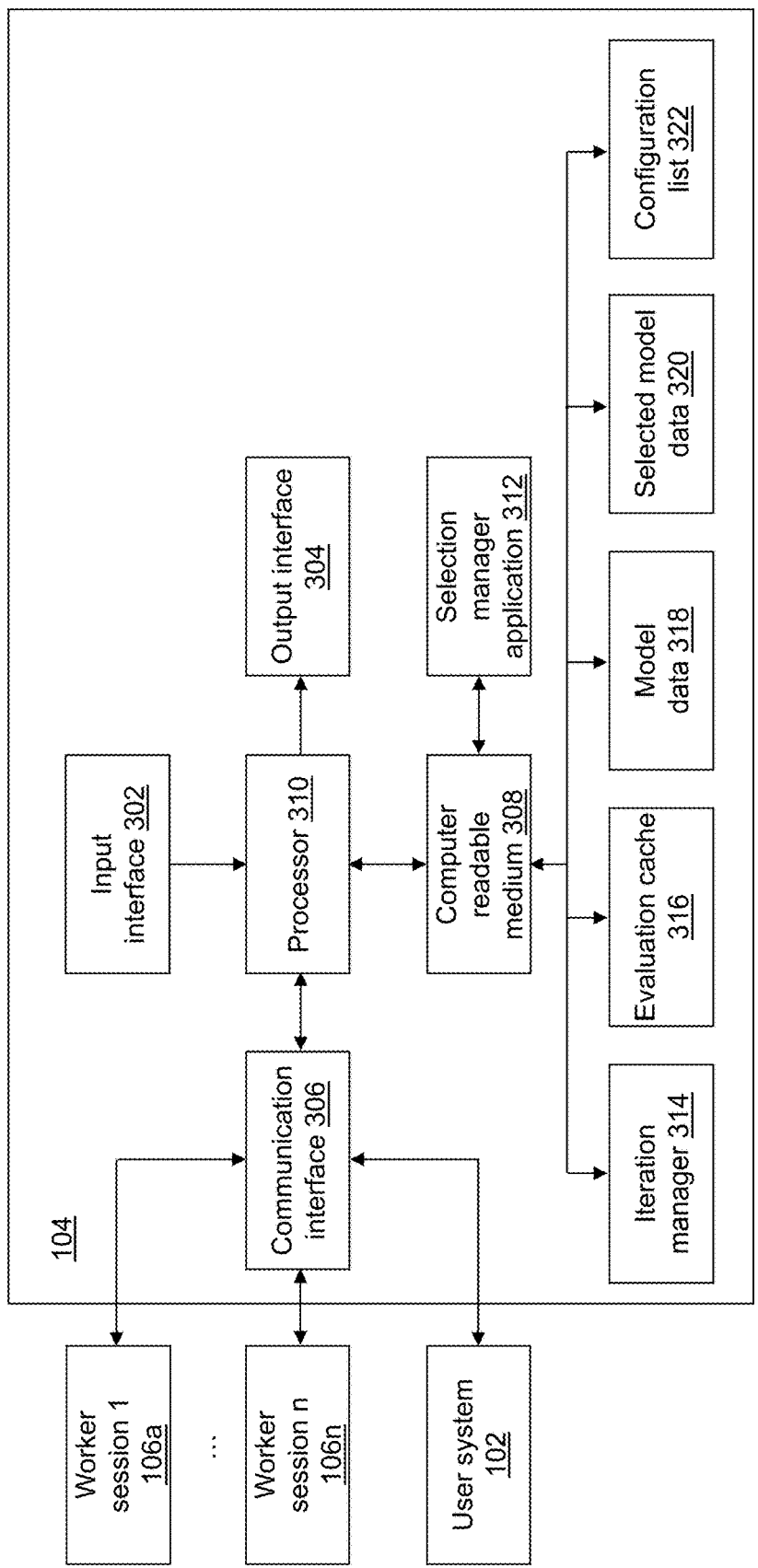
FIG. 3 depicts a block diagram of a selection manager device of the hyperparameter selection system of FIG. 1 in accordance with an illustrative embodiment.

For illustration, referring to FIG. 3, a block diagram of selection manager device 104 is shown in accordance with an illustrative embodiment. Selection manager device 104 may include a second input interface 302, a second output interface 304, a second communication interface 306, a second computer-readable medium 308, a second processor 310, a selection manager application 312, an iteration manager 314, an evaluation cache 316, model data 318, selected model data 320, and a configuration list 322. Selection manager device 104 may execute selection manager application 312 that instantiates iteration manager 314. Iteration manager 314 maintains configuration list 322. Evaluation cache 316, model data 318, and selected model data 320 are created from results generated by worker system 106.

Referring again to FIG. 1, the one or more computing devices of worker system 106 may include computers of any form factor that may be organized into one or more sessions, where a number of the one or more sessions is indicated by n. Worker system 106 may include a number of computing devices indicated by W. Worker system 106 may include computers of other form factors such as a desktop or a laptop, etc. Worker system 106 can include any number and any combination of form factors of computing devices organized into any number of sessions. For example, in the illustrative embodiment, worker system 106 includes a first worker session 106a, . . . , and an nth worker session 106n. Each session may include one or more computing devices, where a number of session computing devices in each session is indicated by P. In the illustrative embodiment, first worker session 106a may include a first computing device 118-11, . . . , and a Pth computing device 118-1P, and nth worker session 106n may include a first computing device 118-n1, . . . , and a Pth computing device 118-nP. The number of computing devices indicated by W may or may not also include selection manager device 104. A number of threads may be associated with each computing device of worker system 106.

The computing devices of worker system 106 may send and receive signals through network 108 to/from selection manager device 104 and/or to/from user system 102 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4A:
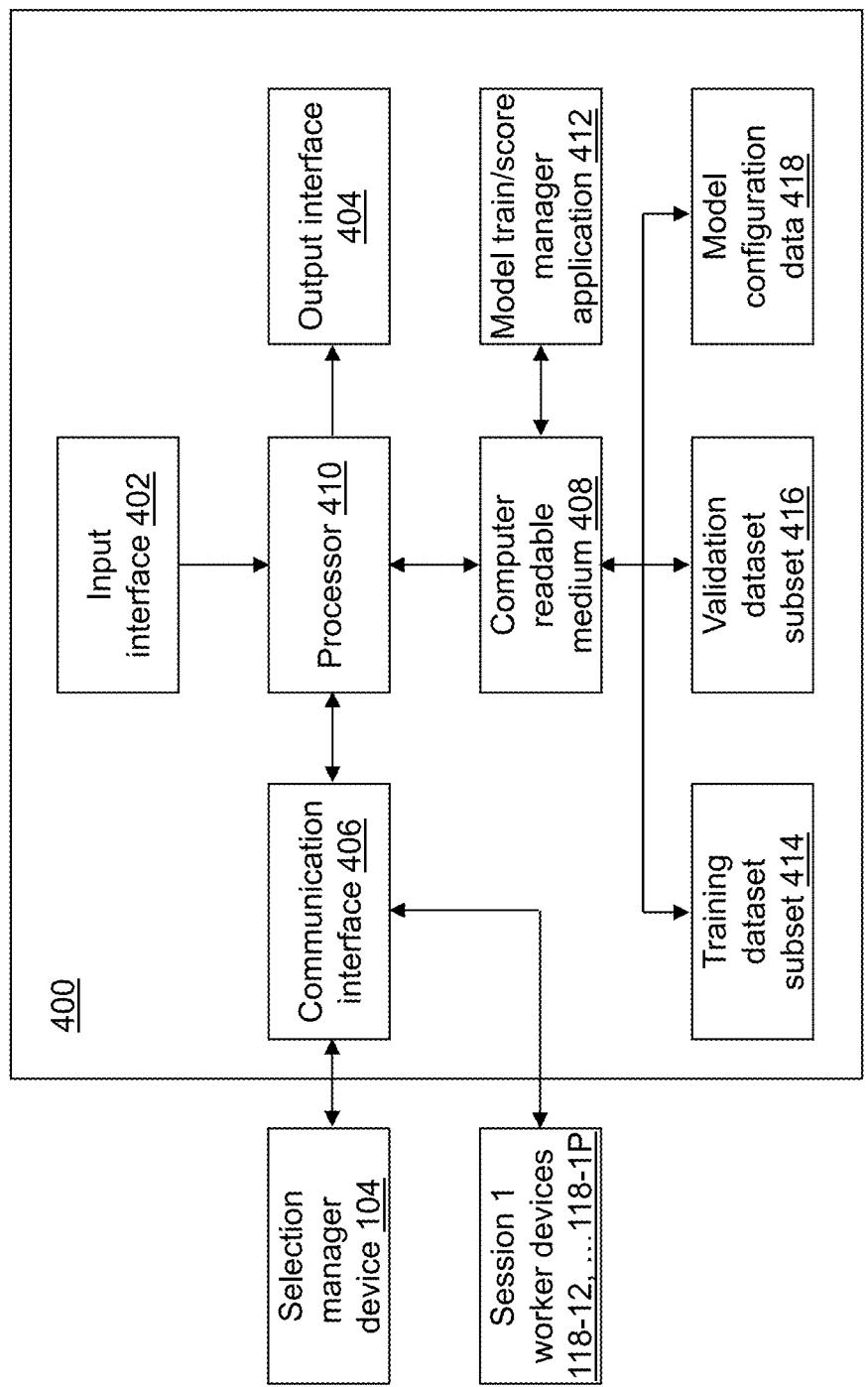
FIG. 4A depicts a block diagram of a session manager device of the hyperparameter selection system of FIG. 1 in accordance with an illustrative embodiment.

For illustration, referring to FIG. 4A, a block diagram of a session manager device 400 is shown in accordance with an example embodiment. Session manager device 400 is an example computing device of each session of worker system 106. For example, a first computing device of each session, such as first computing device 118-11 of first worker session 106a and first computing device 118-n1 of nth worker session 106n, may be an instance of session manager device 400. Session manager device 400 may include a third input interface 402, a third output interface 404, a third communication interface 406, a third computer-readable medium 408, a third processor 410, a model train/score manager application 412, a first training dataset subset 414, a first validation dataset subset 416, and model configuration data 418.

Figure 4B:
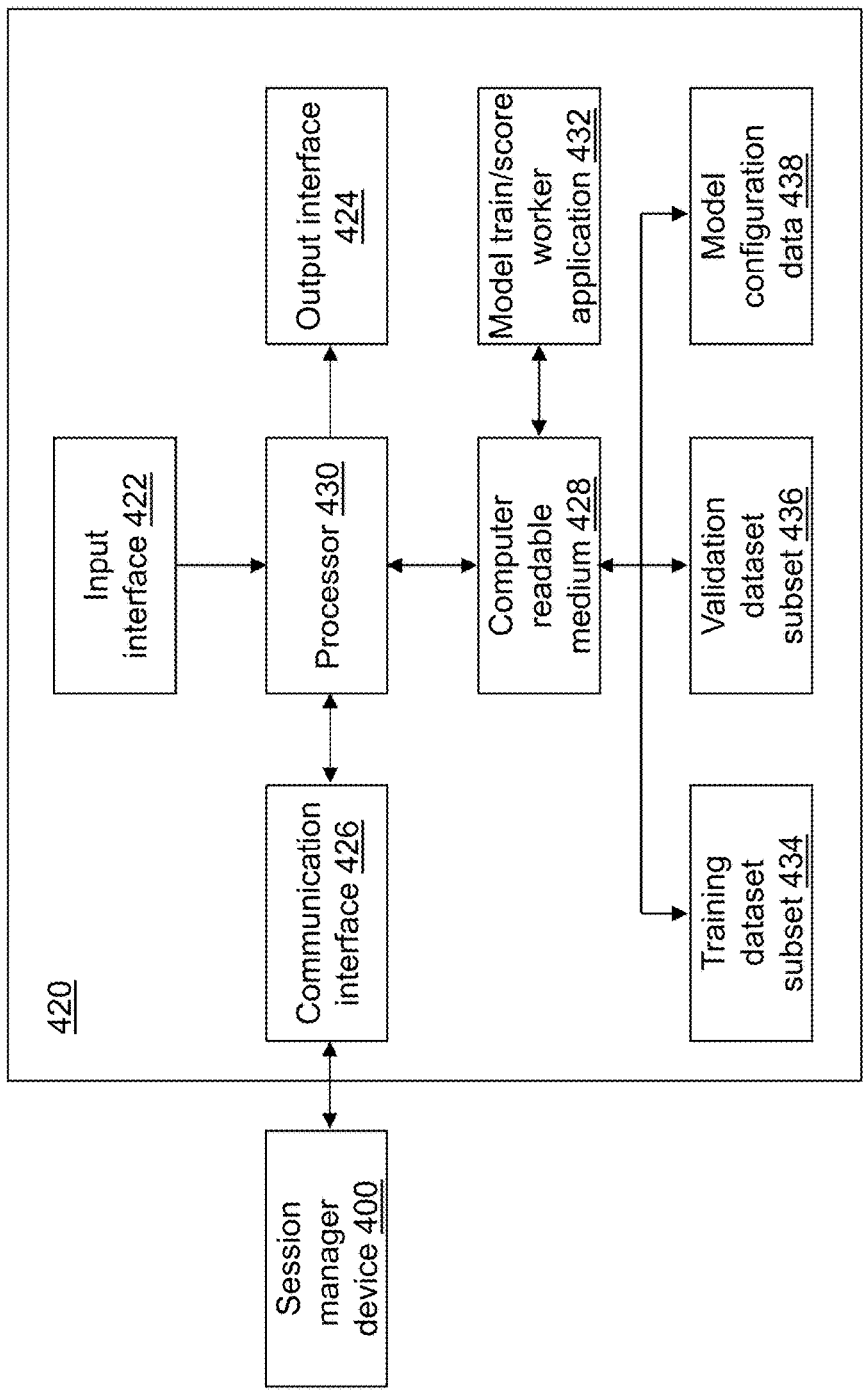
FIG. 4B depicts a block diagram of a session worker device of the hyperparameter selection system of FIG. 1 in accordance with an illustrative embodiment.

For illustration, referring to FIG. 4B, a block diagram of a session worker device 420 is shown in accordance with an example embodiment. Session worker device 420 is an example worker computing device of each session of worker system 106. For example, remaining computing devices of each session, such as . . . , and Pth computing device 118-1P of first worker session 106a and . . . , and Pth computing device 118-nP of nth worker session 106n, may each be an instance of session worker device 420. Session worker device 420 may include a fourth input interface 422, a fourth output interface 424, a fourth communication interface 426, a fourth computer-readable medium 428, a fourth processor 430, a model train/score worker application 432, a Pth training dataset subset 434, a Pth validation dataset subset 436, and model configuration data 438.

Because the input dataset may need to be distributed across a plurality of computing devices, each session may include a plurality of computing devices with one of the computing devices acting as the session manager and referred to as session manager device 400. The input dataset first may be distributed into data subsets at each computing device included in the respective session, with each session distributing the input dataset in a similar manner among its computing devices. For example, if first worker session 106a includes three computing devices, approximately a third of the input dataset is distributed to each computing device of first worker session 106a that may or may not include a first session manager device 400a of first worker session 106a. nth worker session 106n similarly distributes the input dataset among the computing devices of nth worker session 106n. The data subset of input dataset stored at each computing device is also divided into a training dataset subset and a validation dataset subset created from the local data subset. First training dataset subset 414 and first validation dataset subset 416 may be created at session manager device 400. Pth training dataset subset 434 and Pth validation dataset subset 436 may be created at session worker device 420.

Evaluation cache 316, model data 318, and selected model data 320 are created from results generated by worker system 106 executing model train/score manager application 412 with first training dataset subset 414 and first validation dataset subset 416. The model training uses first training dataset subset 414 and/or Pth training dataset subset 434 to generate a predictive model and model scoring uses first validation dataset subset 416 and/or Pth validation dataset subset 436 to determine how well the generated model performed. Model train/score manager application 412 may coordinate generation of the predictive model using model train/score worker application 432 executing at the one or more session worker devices 420 assigned to the session with their allocated subset of the input dataset. Session manager device 400 may or may not include a portion of the input dataset divided into first training dataset subset 414 and first validation dataset subset 416. Instead, session manager device 400 may coordinate the distribution without storing a portion of the input dataset on third computer-readable medium 408.

When cross-validation is performed to determine how well the generated model performed, a number of folds F is defined and the training is performed F−1 times with the performance measure averaged across the F−1 scoring executions with a validation holdout. When cross-validation is performed, the input dataset is partitioned into F subsets (folds). For each fold, a new model is trained on each of the F−1 folds and validated using the selected (holdout) fold. The objective function value is averaged over each set of training and scoring executions to obtain a single error estimate value.

Referring again to FIG. 2, each user device 200 of user system 102 may include the same or different components and combinations of components. Fewer, different, and additional components may be incorporated into user device 200.

Input interface 202 provides an interface for receiving information for entry into user device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into user device 200 or to make selections presented in a user interface displayed on display 216. The same interface may support both input interface 202 and output interface 204. For example, display 216 that includes a touch screen both allows user input and presents output to the user. User device 200 may have one or more input interfaces that use the same or a different input interface technology. The input interface technology further may be accessible by user device 200 through communication interface 206.

Output interface 204 provides an interface for outputting information from user device 200, for example, to a user of user device 200 or to another device. For example, output interface 204 may interface with various output technologies including, but not limited to, display 216, a speaker 218, a printer 220, etc. User device 200 may have one or more output interfaces that use the same or a different interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and messages may be transferred between user device 200 and selection manager device 104 using communication interface 206.

Computer-readable medium 208 is a non-transitory electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD or DVD, an external hard drive, etc. One or more external hard drives further may be connected to user device 200 using communication interface 106.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Model tuning application 222 performs operations associated with selecting a hyperparameter configuration for a model type where the hyperparameter configuration defines a value for each hyperparameter for the model type. The operations may be implemented using hardware, firmware, software, or any combination of these methods. Referring to the example embodiment of FIG. 2, model tuning application 222 is implemented in software (comprised of computer-readable and/or computer-executable instructions) stored in computer-readable medium 208 and accessible by processor 210 for execution of the instructions that embody the operations of model tuning application 222. Model tuning application 222 may be written using one or more programming languages, assembly languages, scripting languages, etc.

Model tuning application 222 may be implemented as a Web application. For example, model tuning application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Model tuning application 222 may be integrated with other analytic tools. As an example, model tuning application 222 may be part of an integrated data analytics software application and/or software architecture such as that offered by SAS Institute Inc. of Cary, N.C., USA. For example, model tuning application 222 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, model tuning application 222 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server, all of which are developed and provided by SAS Institute Inc. of Cary, N.C., USA. Data mining is applicable in a wide variety of industries.

Referring again to FIG. 3, fewer, different, or additional components may be incorporated into selection manager device 104. Second input interface 302 provides the same or similar functionality as that described with reference to input interface 202 of user device 200 though referring to selection manager device 104. Second output interface 304 provides the same or similar functionality as that described with reference to output interface 204 of user device 200 though referring to selection manager device 104. Second communication interface 306 provides the same or similar functionality as that described with reference to communication interface 206 of user device 200 though referring to selection manager device 104. Data and messages may be transferred between selection manager device 104 and/or user device 200 and session manager device 400 using second communication interface 306. Second computer-readable medium 308 provides the same or similar functionality as that described with reference to computer-readable medium 208 of user device 200 though referring to selection manager device 104. Second processor 310 provides the same or similar functionality as that described with reference to processor 210 of user device 200 though referring to selection manager device 104.

Selection manager application 312 performs operations associated with selecting sets of hyperparameter configurations to evaluate for the model type based on inputs provided from user device 200. Selection manager application 312 requests that the computing devices of worker system 106 generate a model for each hyperparameter configuration in the selected sets of hyperparameter configurations. The operations may be implemented using hardware, firmware, software, or any combination of these methods. Referring to the example embodiment of FIG. 3, selection manager application 312 is implemented in software (comprised of computer-readable and/or computer-executable instructions) stored in second computer-readable medium 308 and accessible by second processor 310 for execution of the instructions that embody the operations of selection manager application 312. Selection manager application 312 may be written using one or more programming languages, assembly languages, scripting languages, etc. Selection manager application 312 may be implemented as a Web application.

Selection manager application 312 may be integrated with other analytic tools. As an example, selection manager application 312 may be part of an integrated data analytics software application and/or software architecture such as that offered by SAS Institute Inc. of Cary, N.C., USA. For example, selection manager application 312 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, selection manager application 312 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server, all of which are developed and provided by SAS Institute Inc. of Cary, N.C., USA.

Referring again to FIG. 4A, fewer, different, and additional components may be incorporated into session manager device 400. Each session manager device 400 of each session of worker system 106 may include the same or different components or combination of components.

Third input interface 402 provides the same or similar functionality as that described with reference to input interface 202 of user device 200 though referring to session manager device 400. Third output interface 404 provides the same or similar functionality as that described with reference to output interface 204 of user device 200 though referring to session manager device 400. Third communication interface 406 provides the same or similar functionality as that described with reference to communication interface 206 of user device 200 though referring to session manager device 400. Data and messages may be transferred between session manager device 400 and another computing device of worker system 106 and/or selection manager device 104 using third communication interface 406. Third computer-readable medium 408 provides the same or similar functionality as that described with reference to computer-readable medium 208 of user device 200 though referring to session manager device 400. Third processor 410 provides the same or similar functionality as that described with reference to processor 210 of user device 200 though referring to session manager device 400.

Model train/score manager application 412 may be integrated with other analytic tools. As an example, model train/score manager application 412 may be part of an integrated data analytics software application and/or software architecture such as that offered by SAS Institute Inc. of Cary, N.C., USA. For example, model train/score manager application 412 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, model train/score manager application 412 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server, all of which are developed and provided by SAS Institute Inc. of Cary, N.C., USA.

Referring again to FIG. 4B, fewer, different, and additional components may be incorporated into session worker device 420. Each session worker device 420 of each session of worker system 106 may include the same or different components or combination of components.

Fourth input interface 422 provides the same or similar functionality as that described with reference to input interface 202 of user device 200 though referring to session worker device 420. Fourth output interface 424 provides the same or similar functionality as that described with reference to output interface 204 of user device 200 though referring to session worker device 420. Fourth communication interface 426 provides the same or similar functionality as that described with reference to communication interface 206 of user device 200 though referring to session worker device 420. Data and messages may be transferred between session worker device 420 and another computing device of the associated session of worker system 106 and/or session manager device 400 using fourth communication interface 426. Fourth computer-readable medium 428 provides the same or similar functionality as that described with reference to computer-readable medium 208 of user device 200 though referring to session worker device 420. Fourth processor 430 provides the same or similar functionality as that described with reference to processor 210 of user device 200 though referring to session worker device 420.

Model train/score worker application 432 may be integrated with other analytic tools and may be integrated with model train/score manager application 412 to generate a predictive model using the input dataset distributed across the worker computing devices of each session. As an example, model train/score worker application 432 may be part of an integrated data analytics software application and/or software architecture such as that offered by SAS Institute Inc. of Cary, N.C., USA. For example, model train/score worker application 432 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, model train/score worker application 432 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server, all of which are developed and provided by SAS Institute Inc. of Cary, N.C., USA.

Model tuning application 222, selection manager application 312, model train/score manager application 412, and/or model train/score worker application 432 may be the same or different applications that are integrated in various manners to select a hyperparameter configuration for a predictive model type using the input dataset divided into the training dataset and the validation dataset in a single computing device or a plurality of distributed computing devices.

The input dataset may include, for example, a plurality of rows and a plurality of columns. The plurality of rows may be referred to as observation vectors or records (observations), and the columns may be referred to as variables. The input dataset may be transposed. The input dataset may include supervised and/or unsupervised data. The plurality of variables may define multiple dimensions for each observation vector. An observation vector $x_i$ may include a value for each of the plurality of variables associated with the observation i. Each variable of the plurality of variables may describe a characteristic of a physical object. For example, if the input dataset includes data related to operation of a vehicle, the variables may include an oil pressure, a speed, a gear indicator, a gas tank level, a tire pressure for each tire, an engine temperature, a radiator level, etc. The input dataset may include data captured as a function of time for one or more physical objects. As another example, the input dataset may include data related to images, where each row includes the pixels that define a single image. The images may be of any item for which image recognition or classification may be performed including, but not limited to, faces, objects, alphanumeric letters, terrain, plants, animals, etc.

The data stored in the input dataset may be generated by and/or captured from a variety of sources including one or more sensors of the same or different type, one or more computing devices, etc. The data stored in the input dataset may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

The input dataset may be stored on computer-readable medium 208, on second computer-readable medium 308, on third computer-readable medium 408, and/or on fourth computer-readable medium 428, and/or on one or more computer-readable media accessible by model train/score manager application 412 using third communication interface 406 and/or third input interface 402 or accessible by model train/score worker application 432 using fourth communication interface 426 and/or fourth input interface 422. Data stored in the input dataset may be sensor measurements or signal values captured by a sensor such as a camera, may be generated or captured in response to occurrence of an event or a transaction, generated by a device such as in response to an interaction by a user with the device, etc. The data stored in the input dataset may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in the input dataset may be captured at different time points periodically, intermittently, when an event occurs, etc. One or more columns of the input dataset may include a time and/or date value.

The input dataset may include data captured under normal operating conditions of the physical object. The input dataset may include data captured at a high data rate such as 200 or more observations per second for one or more physical objects. For example, data stored in the input dataset may be generated as part of the Internet of Things (IoT), where things (e.g., machines, devices, phones, sensors) can be connected to networks and the data from these things collected and processed within the things and/or external to the things before being stored in the input dataset. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in the input dataset.

The input dataset may be stored using various structures as known to those skilled in the art including one or more files of a file system, a relational database, one or more tables of a system of tables, a structured query language database, etc. Each session manager device 400 may coordinate access to the input dataset that is distributed across the session worker devices of the associated session that may include zero or more session worker devices. For example, the input dataset may be stored in a cube distributed across the computing devices of each session that is a grid of computers as understood by a person of skill in the art. As another example, the input dataset may be stored across the computing devices of each session that form a multi-node Hadoop® cluster. For instance, Apache™ Hadoop® is an open-source software framework for distributed computing supported by the Apache Software Foundation. As another example, the input dataset may be stored across the computing devices of each session that form a cloud of computers and may be accessed using cloud computing technologies, as understood by a person of skill in the art. The SAS® LASR™ Analytic Server may be used as an analytic platform to enable multiple users to concurrently access data stored in the input dataset. The SAS® Viya™ open, cloud-ready, in-memory architecture also may be used as an analytic platform to enable multiple users to concurrently access data stored in the input dataset. SAS Cloud Analytic Services (CAS) may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5:
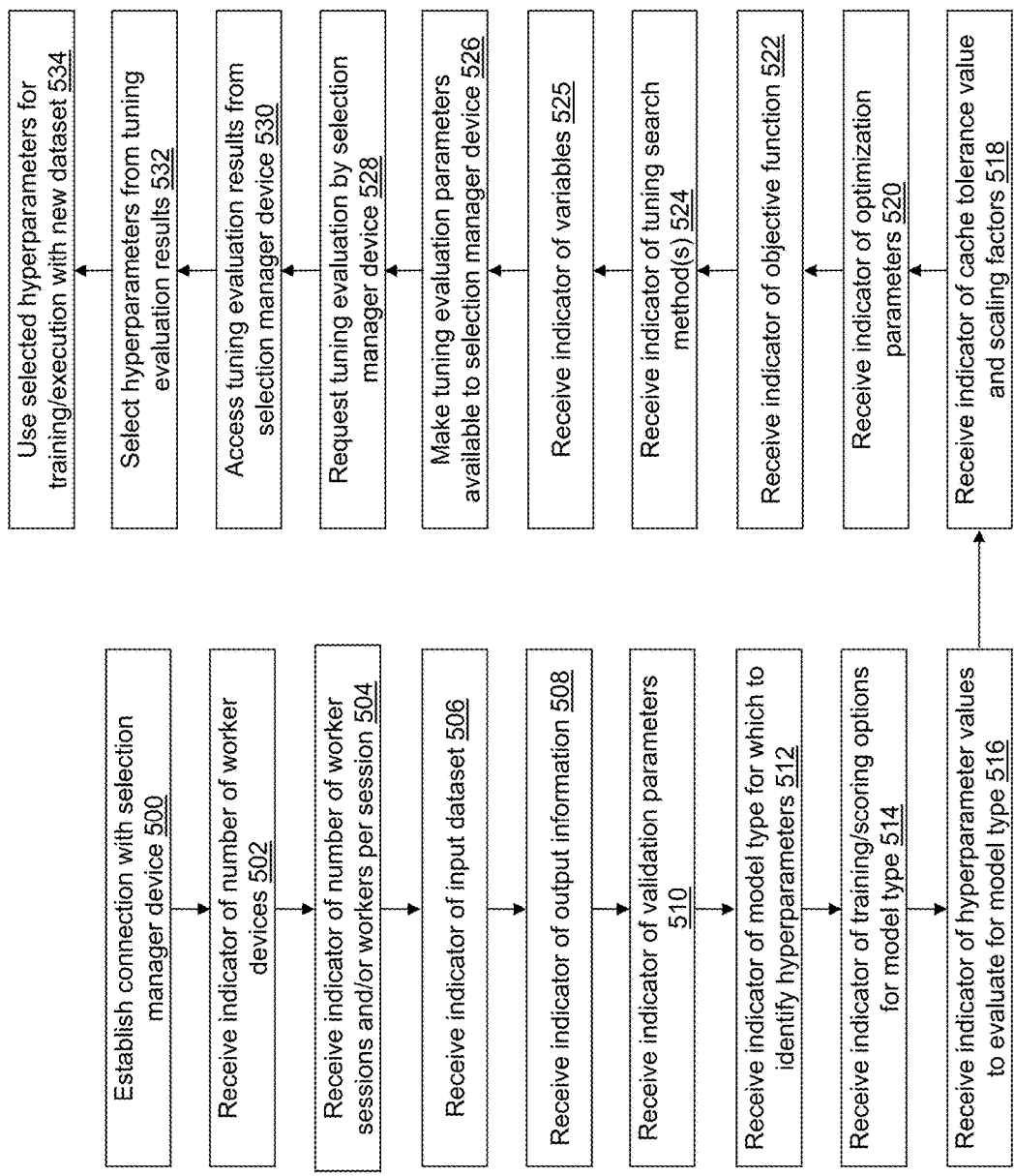
FIG. 5 depicts a flow diagram illustrating examples of operations performed by the user device of FIG. 2 in accordance with an illustrative embodiment.

Referring to FIG. 5, example operations associated with model tuning application 222 are described. Additional, fewer, or different operations may be performed depending on the embodiment. The order of presentation of the operations of FIG. 5 is not intended to be limiting. A user can interact with one or more user interface windows presented to the user in a display under control of model tuning application 222 independently or through a browser application in an order selectable by the user. Although some of the operational flows are presented in sequence, the various operations may be performed in various repetitions, concurrently, and/or in other orders than those that are illustrated. For example, a user may execute model tuning application 222, which causes presentation of a first user interface window, which may include a plurality of menus and selectors such as drop down menus, buttons, text boxes, hyperlinks, etc. associated with model tuning application 222 as understood by a person of skill in the art. As further understood by a person of skill in the art, various operations may be performed in parallel, for example, using a plurality of threads or a plurality of computing devices such as a grid or a cloud of computing devices.

In an operation 500, a connection is established with selection manager device 104. User device 200 accepts commands from a user and relays necessary instructions to selection manager device 104.

In an operation 502, a first indicator may be received that indicates a value of W the number of computing devices or nodes of worker system 106 that may include selection manager device 104 (for example, the same or another indicator may indicate whether or not to include selection manager device 104 or it may or may not be included by default). The first indicator may further indicate whether selection manager device 104 is configured in a single-machine mode or a distributed mode. In an alternative embodiment, the first indicator may not be received. For example, a default value may be stored, for example, in computer-readable medium 208 and used automatically. In another alternative embodiment, W may not be selectable. Instead, a fixed, predefined value may be used. The value further may be automatically determined based on a number of computing devices connected to selection manager device 104.

Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on selection manager device 104. More simply, single-machine mode means multithreading on selection manager device 104. Single-machine mode uses the number of CPUs (cores) on selection manager device 104 to determine the number of concurrent threads. For example, one thread per core may be used though a number of threads on any computing device may be changed under control of the user. A grid host may be specified for a distributed mode and identify a domain name system (DNS) or IP address of selection manager device 104, when selection manager device 104 is a separate device from user device 200.

In an operation 502, a second indicator may be received that indicates the value of n the number of the one or more sessions and/or the value of P the number of computing devices included in each session. Within each session, when a train or score action is executed, each computing device of that session also may use multiple threads. In an alternative embodiment, the second indicator may not be received. For example, default values may be stored, for example, in computer-readable medium 208 and used automatically. In another alternative embodiment, P or n may not be selectable. Instead, a fixed, predefined value may be used. The value(s) further may be automatically determined based on W and other criteria as described further below such that the user does not specify either or one of n the number of the one or more sessions and P the number of computing devices included in each session.

In an operation 506, a third indicator may be received that indicates the input dataset. For example, the first indicator indicates a location and a name of the input dataset. As an example, the first indicator may be received by model tuning application 222 after selection from a user interface window or after entry by a user into a user interface window.

In an operation 508, a fourth indicator may be received that provides output information that describes an output to be captured from execution of model tuning application 222 in combination with selection manager application 312. For example, the fourth indicator indicates a location and a name of model data 318 and/or of selected model data 320 that may include one or more tables of data. As an example, the fourth indicator may be received by model tuning application 222 after selection from a user interface window or after entry by a user into a user interface window. In an alternative embodiment, the location and the name of model data 318 and/or of selected model data 320 may not be selectable. Instead, tables are created by default in a default location automatically. Example tables include a "Tuner Information" output table that summarizes values of options specified by the user to control execution of model tuning application 222; a "Tuner Results" output table that includes a default configuration and up to ten of the best hyperparameter configurations (based on an extreme (minimum or maximum) objective function value) identified, where each configuration listed includes the hyperparameter values and objective function value for comparison; a "Tuner Evaluation History" output table that includes all of the hyperparameter configurations evaluated, where each configuration listed includes the hyperparameter values and objective function value for comparison; a "Best Configuration" output table that includes values of the hyperparameters and the objective function value for the best configuration identified; a "Tuner Summary" output table that includes statistics about execution of the tuning process; a "Tuner Task Timing" output table that includes timing information about the different tasks performed during the tuning process; and a trained model output that includes information to execute the model generated using the input dataset with the best hyperparameter configuration. For example, the trained model output includes information to execute the model generated using the input dataset with the best hyperparameter configuration that may be saved in selected model data 320 and used to score a second dataset 1824 (shown referring to FIG. 18) as discussed further below. For illustration, selected model data 320 may be stored using the SAS ASTORE format developed and provided by SAS Institute Inc. of Cary, N.C., USA for faster in-memory scoring. The other output tables may be stored in model data 318 or another location as specified by the user. For example, one or more of the output tables may be selected by the user for presentation on display 216. As another option, the fourth indicator is not received, and the output is generated automatically.

In an operation 510, a fifth indicator may be received that provides validation parameters that describe a validation process to be used by each session of worker system 106. For example, the fifth indicator may include a fraction value for a fraction of the input dataset to be used for validation or the number of folds F for cross-validation. In an alternative embodiment, the fifth indicator may not be received. For example, a default value may be stored, for example, in computer-readable medium 208 and used automatically. In another alternative embodiment, a fixed, predefined value may be used for the fraction value unless the number of folds F is defined by the user. In cross validation, each model evaluation requires F−1 number of training executions and scoring executions with different training subsets as discussed previously. Thus, the evaluation time is increased by approximately a factor of F−1. For small to medium sized input datasets or for unbalanced input datasets, cross validation provides on average a better representation of error across the entire input dataset.

In an operation 512, a sixth indicator of a model type for which to identify a best hyperparameter configuration may be received. For example, the sixth indicator indicates a name of a model type. The sixth indicator may be received by training application 122 after selection from a user interface window or after entry by a user into a user interface window. As an example, a model type may be selected from "Decision Tree", "Factorization Machine", "Forest", "Gradient Boosting Tree", "Neural Network", "Support Vector Machine", etc. Of course, the model type may be labeled or selected in a variety of different manners by the user as understood by a person of skill in the art. In an alternative embodiment, the model type may not be selectable, and a single model type is implemented in training application 122.

The Decision Tree model type automatically adjusts decision tree hyperparameters to tune a decision tree model for minimum error as measured by a specified objective function. For illustration, a tuneDecisionTree action selects different hyperparameter configurations to run a dtreeTrain action, optionally a dtreePrune action, and a dtreeScore action (an assess action may be run after each dtreeScore action) multiple times to train and validate a decision tree model as it searches for a model that has reduced validation error. For illustration, the tuneDecisionTree action, the dtreeTrain action, the dtreePrune action, and the dtreeScore action are included in SAS® Viya™ and SAS® Cloud Analytic Services (CAS) developed and provided by SAS Institute Inc. of Cary, N.C., USA.

The Forest model type automatically adjusts forest hyperparameters to tune a Forest model for minimum error as measured by a specified objective function. The Forest model type creates a decision tree recursively by choosing an input variable and using it to create a rule to split the data into two or more subsets. The process is repeated in each subset, and again in each new subset, and so on until a constraint is met. In the terminology of the tree metaphor, the subsets are nodes, the original data table is a root node, and final unpartitioned subsets are leaves or terminal nodes. A node is an internal node if it is not a leaf. The data in a leaf determine estimates of the value of the target variable. These estimates are subsequently applied to predict the target of a new observation that is assigned to the leaf.

For illustration, a FOREST procedure included in SAS® Visual Data Mining and Machine Learning 8.1 may be used to implement the forest model type in SAS® Viya™ developed and provided by SAS Institute Inc. of Cary, N.C., USA. The FOREST procedure creates a predictive model called a forest, which consists of several decision trees, in SAS Viya. The FOREST procedure creates multiple decision trees that differ from each other in two ways: 1) the training data for each tree constitutes a different sample, and each sample is created by sampling, with replacement, observations from the original training data of the forest, and 2) the input variables that are considered for splitting a node are randomly selected from all available inputs. Among these randomly selected variables, the FOREST procedure chooses a single variable, which is associated the most with the target, when it forms a splitting rule. The FOREST procedure creates an ensemble of decision trees to predict a single target of either interval or nominal measurement level. An input variable can have an interval or nominal measurement level.

For illustration, an "autotune" statement used with the FOREST procedure included in SAS® Visual Data Mining and Machine Learning 8.1 may be used to evaluate different hyperparameter configurations and to select the best configuration of hyperparameter values for the forest model type. A tuneForest action selects different hyperparameter configurations to run a forestTrain action and a forestScore action multiple times to train and validate the forest model as it searches for a model that has reduced validation error. For illustration, the tuneForest action, the forestTrain action, and the forestScore action are included in SAS® Viya™ and SAS® Cloud Analytic Services (CAS) developed and provided by SAS Institute Inc. of Cary, N.C., USA.

The Factorization Machine model type automatically adjusts factorization machine parameters to tune a factorization machine model for minimum error as measured by a specified objective function. For illustration, a FACTMAC procedure included in SAS® Visual Data Mining and Machine Learning 8.1 may be used to implement the factorization machine model type in SAS® Viya™ all developed and provided by SAS Institute Inc. of Cary, N.C., USA. The Factorization Machine model type generalizes a matrix factorization. The FACTMAC procedure estimates factors for each of the nominal input variables specified, in addition to estimating a global bias and a bias for each level of the nominal input variables. An interval target variable is also specified. The FACTMAC procedure computes the biases and factors by using a stochastic gradient descent (SGD) algorithm that minimizes a root mean square error (RMSE) criterion.

For illustration, an "autotune" statement used with the FACTMAC procedure included in SAS® Visual Data Mining and Machine Learning 8.1 may be used to evaluate different hyperparameter configurations and to select the best configuration of hyperparameter values for the Forest model type. A tuneFactmac action selects different hyperparameter configurations to run the factmac action of the factmac action set, the score action of the astore action set, and the assess action of the percentile action set to train and validate factorization machine models as it searches for a model that has reduced validation error. For illustration, the factmac action, the score action, and the assess action are included in SAS® Viya™ and SAS® Cloud Analytic Services (CAS) developed and provided by SAS Institute Inc. of Cary, N.C., USA.

The Gradient Boosting Tree model type automatically adjusts gradient boosting tree parameters to tune a gradient boosting tree model for minimum error as measured by a specified objective function. The Gradient Boosting Tree model type consists of multiple decision trees. For illustration, a GRADBOOST procedure included in SAS® Visual Data Mining and Machine Learning 8.1 may be used to implement the Gradient Boosting Tree model type in SAS® Viya™ all developed and provided by SAS Institute Inc. of Cary, N.C., USA. The GRADBOOST procedure creates a predictive model called a gradient boosting tree model in SAS Viya. The GRADBOOST procedure creates a predictive model by fitting a set of additive trees.

For illustration, an "autotune" statement used with the GRADBOOST procedure included in SAS® Visual Data Mining and Machine Learning 8.1 may be used to evaluate different hyperparameter configurations and to select the best configuration of hyperparameter values for the Forest model type. A tuneGradientBoostTree action selects different hyperparameter configurations to run the gbtreeTrain and gbtreeScore actions multiple times to train and validate gradient boosting tree models as it searches for a model that has reduced validation error. For illustration, the gbtreeTrain and gbtreeScore actions are included in the decision Tree action set of SAS® Viya™ and SAS® Cloud Analytic Services (CAS) developed and provided by SAS Institute Inc. of Cary, N.C., USA.

The Neural Network model type automatically adjusts neural network parameters to tune a neural network model for minimum error as measured by a specified objective function. For illustration, a NNET procedure included in SAS® Visual Data Mining and Machine Learning 8.1 may be used to implement the Neural Network model type in SAS® Viya™ all developed and provided by SAS Institute Inc. of Cary, N.C., USA. The NNET procedure trains a multilayer perceptron neural network. Training a multilayer perceptron neural network relies on an unconstrained minimization of a nonlinear objective function.

For illustration, an "autotune" statement used with the NNET procedure included in SAS® Visual Data Mining and Machine Learning 8.1 may be used to evaluate different hyperparameter configurations and to select the best configuration of hyperparameter values for the neural network model type. A tuneNeuralNet action selects different hyperparameter configurations to run the annTrain and annScore actions multiple times to train and validate neural network models as it searches for a model that has reduced validation error. For illustration, the annTrain and annScore actions are included in the neuralNet action set of SAS® Viya™ and SAS® Cloud Analytic Services (CAS) developed and provided by SAS Institute Inc. of Cary, N.C., USA.

The Support Vector Machine model type automatically adjusts support vector machine parameters to tune a support vector machine model for minimum error as measured by a specified objective function. For illustration, a SVMACHINE procedure included in SAS® Visual Data Mining and Machine Learning 8.1 may be used to implement the Support Vector Machine model type in SAS® Viya™ all developed and provided by SAS Institute Inc. of Cary, N.C., USA. The Support Vector Machine model type computes support vector machine learning classifiers for a binary pattern recognition problem. The SVMACHINE procedure uses both linear and low-degree polynomial kernels to conduct the computation.

For illustration, an "autotune" statement used with the SVMACHINE procedure included in SAS® Visual Data Mining and Machine Learning 8.1 may be used to evaluate different hyperparameter configurations and to select the best configuration of hyperparameter values for the support vector machine model type. A tuneSvm action selects different hyperparameter configurations to run the svm Train action of the svm action set, the score action of the astore action set, and the assess action of the percentile action set to train and validate support vector machine models as it searches for a model that has reduced validation error. For illustration, the svm Train action is included in the svm action set of SAS® Viya™ and SAS® Cloud Analytic Services (CAS) developed and provided by SAS Institute Inc. of Cary, N.C., USA.

In an operation 514, a seventh indicator may be received that defines values for one or more variables associated with training the selected model type and/or values for one or more variables associated with scoring the selected model type.

In an operation 516, an eighth indicator may be received that defines values for one or more of the hyperparameters to evaluate based on the selected model type. Using the eighth indicator, the user may identify one or more of the hyperparameters to exclude from the evaluation such that a single value is used for that hyperparameter when selecting values for each hyperparameter configuration. When a hyperparameter is excluded, a default value defined for the hyperparameter may be used for each hyperparameter configuration. Using the eighth indicator, the user may select one or more of the hyperparameters to evaluate using a lower bound value, an upper bound value, and an iteration value and/or a specific value instead of the default value. Using the eighth indicator, the user may identify one or more of the hyperparameters to evaluate using a list of possible values instead of a range of default values. Using the eighth indicator, the user may identify one or more of the hyperparameters to evaluate using default bounds and initial values.

For example, the decision tree model type hyperparameters may include a maximum number of decision tree levels (maxLevel), a number of bins to use for numeric variables during calculation of the decision tree (nBins), and a split criterion for each tree node (crit). A value for each of these hyperparameters is defined in each hyperparameter configuration for the decision tree model type. The methodology by which the values are determined is based on the tuning search method discussed further below and the values, if any, indicated in operation 516.

For example, the factorization machine model type hyperparameters may include a number of factors (nFactors), a learning step (learnStep), and a maximum number of iterations (maxIter). A value for each of these hyperparameters is defined in each hyperparameter configuration for the factorization machine model type The methodology by which the values are determined is based on the tuning search method discussed further below and the values, if any, indicated in operation 516.

For example, the forest model type hyperparameters may include a fraction (bootstrap) of a random bootstrap sample of the training data to be used for growing each tree in the forest, where the fraction is a value between 0 and 1 with a default value of 0.6. The forest model type hyperparameters further may include a maximum depth (maxLevel) of a decision tree to be grown where a number of levels in a tree is equal to a depth value plus one. A default value for the maximum depth may be 20. The forest model type hyperparameters further may include a number of trees (nTree) to grow, which by default may be equal to 100. The forest model type hyperparameters further may include a number of input variables (m) to consider splitting on in a node, where the value is between one and a number of input variables with a default value equal to a square root of the number of input variables. A value for each of these hyperparameters is defined in each hyperparameter configuration for the forest model type. The methodology by which the values are determined is based on the tuning search method discussed further below and the values, if any, indicated in operation 516.

For example, the gradient boosting tree model type hyperparameters may include an L1 norm regularization parameter (lasso) that is greater than or equal to zero with a default value of zero. The gradient boosting tree model type hyperparameters further may include a learning rate (learningRate) that is between zero and one, inclusive, with a default value of 0.1. The gradient boosting tree model type hyperparameters further may include a number of trees (nTree) to grow with a default value of 100. The gradient boosting tree model type hyperparameters further may include an L2 norm regularization parameter (ridge) that is greater than or equal to zero with a default value of zero. The gradient boosting tree model type hyperparameters further may include a fraction (subSampleRate) of the training data to be used for growing each tree with a default value of 0.5. The gradient boosting tree model type hyperparameters further may include a number of input variables (m) to consider splitting on in a node where the value is between one and a number of input variables with a default value equal to the number of input variables. A value for each of these hyperparameters is defined in each hyperparameter configuration for the gradient boosting tree model type. The methodology by which the values are determined is based on the tuning search method discussed further below and the values, if any, indicated in operation 516.

For example, the neural network model type hyperparameters may include a range of an annealing rate (annealingRate) to use when a stochastic gradient descent (SGD) algorithm is used for training. The neural network model type hyperparameters further may include a learning rate (learningRate) when the SGD algorithm is used for training. The neural network model type hyperparameters further may include a number of hidden layers (nHidden) in the network between zero and five with a default value of two. The neural network model type hyperparameters further may include tuning information for neurons in the ith hidden layer, where i is any integer between one and five, inclusive. The neural network model type hyperparameters further may include an L1 norm regularization parameter (regL1) that is greater than or equal to zero with a default value of zero. The neural network model type hyperparameters further may include an L2 norm regularization parameter (regL2) that is greater than or equal to zero with a default value of zero. A value for each of these hyperparameters is defined in each hyperparameter configuration for the neural network model type. The methodology by which the values are determined is based on the tuning search method discussed further below and the values, if any, indicated in operation 516.

For example, the support vector machine model type hyperparameters may include a penalty value C that is greater than zero. The support vector machine model type hyperparameters further may include a degree value (degree) that can be between one and three, inclusive. The degree value equal to one is used in a linear kernel. The degree value equal to two or three is used in a polynomial kernel. A value for each of these hyperparameters is defined in each hyperparameter configuration for the support vector machine model type. The methodology by which the values are determined is based on the tuning search method discussed further below and the values, if any, indicated in operation 516.

Table 1 below summarizes the hyperparameters for each model type and the default values or range of values used unless different values are indicated in operation 516:

TABLE 1

| Hyperparameter | Initial Value | Lower Bound | Upper Bound |
| --- | --- | --- | --- |
| Decision Tree (PROC TREESPLIT) | | | |
| MAXDEPTH | 10 | 1 | 19 |
| NUMBIN | 20 | 20 | 200 |
| CRITERION | GAIN (nominal target) VARIANCE (interval target) | GAIN, IGR, GINI, CHISQUARE, CHAID (nominal target) VARIANCE, FTEST, CHAID (interval target) | |
| Forest (PROC FOREST) | | | |
| NTREES | 100 | 20 | 150 |
| VARS_TO_TRY | sqrt(# inputs) | 1 | # inputs |
| INBAGFRACTION | 0.6 | 0.1 | 0.9 |
| MAXDEPTH | 20 | 1 | 29 |
| Gradient Boosting Tree (PROC GRADBOOST) | | | |
| NTREES | 100 | 20 | 150 |
| VARS_TO_TRY | # inputs | 1 | # inputs |
| LEARNINGRATE | 0.1 | 0.01 | 1.0 |
| SAMPLINGRATE | 0.5 | 0.1 | 1.0 |
| LASSO | 0.0 | 0.0 | 10.0 |
| RIDGE | 0.0 | 0.0 | 10.0 |
| Neural Network (PROC NNET) | | | |
| NHIDDEN | 0 | 0 | 5 |
| NUNITS1, . . . , 5 | 1 | 1 | 100 |
| REGL1 | 0 | 0 | 10.0 |
| REGL2 | 0 | 0 | 10.0 |
| LEARNINGRATE | 1E−3 | 1E−6 | 1E−1 |
| ANNEALINGRATE | 1E−6 | 1E−13 | 1E−2 |
| Support Vector Machine (PROC SVMACHINE) | | | |
| C | 1.0 | 1E−10 | 100.0 |
| DEGREE | 1 | 1 | 3 |
| Factorization Machine (PROC FACTMAC) | | | |
| NFACTORS | 5 | 5, 10, 15, 20, 25, 30 | |
| MAXITER | 30 | 10, 20, 30, . . . , 200 | |
| LEARNSTEP | 1E−3 | 1E−6, 1E−5, 1E−4, 1E−3, 1E−2, 1E−1, 1.0 | |

For illustration, a syntax for specifying custom definitions of hyperparameters to tune is TUNINGPARAMETERS=

(<suboption> <suboption> . . . ) where each <suboption> is specified as: <hyperparameter name> (LB=LB_number UB=UB_number VALUES=value-list INIT=INIT_number EXCLUDE), where LB_number indicates a lower bound value that overrides the default lower bound value, UB_number indicates an upper bound value that overrides the default upper bound value, value-list indicates a list of values to try, INIT_number indicates an initial value to use in training a baseline model, and EXCLUDE indicates whether or not to exclude the hyperparameter from the tuning evaluation by using a fixed value specified for the hyperparameter or the default value if none is specified.

In an operation 518, a ninth indicator may be received that defines a cache tolerance value and a scaling factor value for each hyperparameter. The cache tolerance value is used to determine when a subsequent hyperparameter configuration is "close enough" to a previously executed configuration to not repeat execution with the subsequent hyperparameter configuration. The scaling factor value for each hyperparameter is used to scale the hyperparameters relative to each other. In an alternative embodiment, the ninth indicator may not be received. For example, default value may be stored, for example, in computer-readable medium 208 and used automatically. An illustrative default value for the cache tolerance value is 1 e−9. An illustrative default value for the scaling factor value for each hyperparameter is one. In another alternative embodiment, the cache tolerance value and the scaling factor value for each hyperparameter may not be selectable. Instead, fixed, predefined values may be used.

In an operation 520, a tenth indicator may be received that defines values for one or more optimization parameters. For example, a maximum number of configuration evaluations, a maximum number of iterations, a maximum time, and/or a maximum number of configurations to evaluate in a single iteration may be defined by the tenth indicator. Table 2 below summarizes illustrative default and allowed values for the one or more optimization parameters:

TABLE 2

| Option | Default Value | Allowed Values |
|---|---|---|
| Optimization Algorithm Options | | |
| MAXEVALS | 50 | [3 − ∞] |
| MAXITER | 5 | [1 − ∞] |
| MAXTIME | 36,000 | [1 − ∞] |

In an operation 522, an eleventh indicator of an objective function may be received. For example, the eleventh indicator indicates a name of an objective function. The objective function specifies a measure of model error (performance) to be used to identify a best configuration of the hyperparameters among those evaluated. The eleventh indicator may be received by training application 122 after selection from a user interface window or after entry by a user into a user interface window. A default value for the objective function may further be stored, for example, in computer-readable medium 208. As an example, an objective function may be selected from "ASE", "AUC", "F05", "F1", "GAMMA", "GINI", "KS", "MAE", "MCE", "MCLL", "MISC", "MSE", "MSLE", "RASE", "RMAE", "RMSLE", "TAU", etc. Some values can be specified only when the target variable is of a particular type. For example, a default objective function may be the "MISC" objective function for nominal type targets or "MSE" for interval type targets. Of course, the objective function may be labeled or selected in a variety of different manners by the user as understood by a person of skill in the art. In an alternative embodiment, the objective function may not be selectable, and a single objective function is implemented in training application 122. For example, the MISC" objective function may be used by default or without allowing a selection for nominal type targets and "MSE" may be used by default or without allowing a selection for interval type targets.

ASE uses an average squared error as the objective function; AUC uses an area under a curve as the objective function (nominal type only); F05 uses a F0.5 coefficient as the objective function (nominal type only); F1 uses an F1 coefficient as the objective function (nominal type only); GAMMA uses a gamma coefficient as the objective function (nominal type only); GINI uses a Gini coefficient as the objective function (nominal type only); KS uses a Kolmogorov-Smirnov coefficient as the objective function (nominal type only); MAE uses a mean absolute error as the objective function (interval type only); MCE uses a misclassification rate as the objective function (nominal type only); MCLL uses a multiclass log loss as the objective function (nominal type only); MISC uses a misclassification error percentage as the objective function (nominal type only); MSE uses a mean squared error as the objective function (interval type only); MSLE uses a mean squared logarithmic error as the objective function (interval type only); RASE uses a root average squared error as the objective function; RMAE uses a root mean absolute error as the objective function (interval type only); RMSLE uses a root mean squared logarithmic error as the objective function (interval type only); TAU uses a tau coefficient as the objective function (nominal type only).

The following notation is used to provide a discussion of fit statistics for illustrative objective functions:

$n_o$ is a number of observations in a dataset,
r is a number of levels for a nominal target,
N is a sum of observation frequencies in the data,
$\omega_1$ is a frequency of observation i, so $N=\Sigma_{i=1}^{n_o}\omega_i$,
$y_i$ is a target value of observation i,
$\hat{y}_i$ is a predicted target value of observation i,
m is a number of target levels,
$t_i$ is a level from the target in observation i,
$\hat{t}_t$ is a predicted level from the target in observation i,
$y_{i,j}=1$ if observation i is assigned to target level j, otherwise $y_{i,j}=0$,
$p_{i,j}$ is a predicted probability that observation i is assigned to target level j,
$m_{tc}$ is a number of total cutoff points,
$a_k$ is a true positive at cutoff point k,
$b_k$ is a false positive at cutoff point k,
$c_k$ is a false negative at cutoff point k,
$\theta=\Sigma_{k=1}^{m_{tc}}(a_{k-1}-a_k)(b_{k-1}-b_k)$,
$\mu=\Sigma_{k=2}^{m_{tc}}((a_{k-1}-a_k)\Sigma_{j=1}^{k}(b_{j-1}-b_j))$,
$w=\Sigma_{k=2}^{m_{tc}}((a_{k-1}-a_k)\Sigma_{k=2}^{m_{tc}}(b_{j-1}-b_j))$
$\rho=a_0 b_0$,
$a_{m_{tc}}=0$,
$b_{m_{tc}}=$
$p=a_k/(a_k+b_k)$,
$q=a_k/(a_k+c_k)$, and
$\beta=0.5$.

For interval targets, the objective functions may be defined as:

$$ASE = \frac{1}{N}\sum_{i=1}^{n_o}\omega_i(y_i-\hat{y}_i)^2,$$

-continued $$RASE = \sqrt{ASE},$$

$$MSLE = \frac{1}{N}\sum_{i=1}^{n_o} \omega_i(\log(\hat{y}_i + 1) - \log(y_i + 1))^2,$$

$$RMSLE = \sqrt{MSLE},$$

$$MAE = \frac{1}{N}\sum_{i=1}^{n_o} \omega_i |y_i - \hat{y}_i|, \text{ and}$$

$$RMAE = \sqrt{MAE}.$$

For nominal targets, the objective functions may be defined as:

$$ASE = \frac{1}{rN}\sum_{i=1}^{n_o}\sum_{j=1}^{m} \omega_i(y_{i,j} - p_{i,j})^2,$$

$$RASE = \sqrt{ASE},$$

$$MCE = \frac{1}{N}\sum_{t_i \neq \hat{t}_i} \omega_i, \text{ and}$$

$$MCLL = -\frac{1}{N}\sum_{i=1}^{n_o}\sum_{j=1}^{m} \omega_i y_{i,j} \log p_{i,j}.$$

Additional objective functions may be defined as:

$$AUC = \frac{\mu + \theta/2}{\rho},$$

$$GINI = \frac{\mu - w}{\rho},$$

$$GAMMA = \frac{\mu - w}{\mu + w},$$

$$TAU = \frac{\mu - w}{N/2(N-1)}, \text{ and}$$

$$F05 = \frac{(1 + \beta^2)pq}{\beta^2 p + q}.$$

In an operation 524, a twelfth indicator of a tuning search method used to identify a best hyperparameter configuration may be received. For example, the twelfth indicator indicates a name of one or more tuning search methods. The one or more tuning search methods may be indicated to run simultaneously and/or successively. When executed successively, objective function values from one or more previous iterations are used to determine a next iteration of a set of hyperparameter configurations to be evaluated.

The twelfth indicator may be received by training application 122 after selection from a user interface window or after entry by a user into a user interface window. A default value for the tuning search method may further be stored, for example, in computer-readable medium 208. As an example, the one or more tuning search methods may be selected from "Grid", "Random", "Latin Hypercube Sampling (LHS)", "Genetic Algorithm (GA)", "Generating Set Search (GSS)", "Bayesian", "DIRECT", "Nelder-Mead Simplex", "DIRECT/Nelder-Mead Hybrid", "Random+GA", "Random+GA/GSS", "Random+Bayesian", "LHS+GA", "LHS+GA/GSS", "LHS+Bayesian", etc. In the illustrative selections, "+" indicates a successive execution. Simultaneous execution may be indicated by a comma delimited list of tuning search method selections such as "LHS, GA1, Bayesian". Multiple search methods of the same search method type may be defined with different parameter values. For example, "LHS,LHS" may be specified. The twelfth indicator may further include one or more tuning search parameter values associated with each indicated tuning search method. For example, a random seed value may be specified for each search method that may be the same for all search methods or may be defined separately for each search method.

A default tuning search method may be the "LHS+GA/GSS" tuning search method in which an LHS search method is used to generate a first set of hyperparameter configurations that are each executed to generate an objective function value using the objective function indicated in operation 522. The objective function values and the hyperparameter configuration associated with each are used to initialize a GA search method. Each population of the GA search method may be enhanced with a "growth step" in which a GSS search method is used to locally improve some of the more promising members of the GA population. Of course, the tuning search method may be labeled or selected in a variety of different manners by the user as understood by a person of skill in the art. In an alternative embodiment, the one or more tuning search methods may not be selectable, and a single tuning search method is implemented in training application 122. For example, the "LHS+GA/GSS" tuning search method may be used by default or without allowing a selection.

For illustration, the Grid search method generates uniform hyperparameter values across the range of each hyperparameter and combines them across hyperparameters. If the Grid search method is selected, a grid size (number of samples value) may be specified for all or for each hyperparameter that defines the size of the grid and therefore, the number of hyperparameter configurations to evaluate in a single iteration.

For illustration, the Random search method randomly generates hyperparameter values across the range of each hyperparameter and combines them across hyperparameters. If the Random search method is selected, a sample size value may be specified for all or for each hyperparameter that defines the number of hyperparameter configurations to evaluate in a single iteration.

For illustration, the LHS search method generates uniform hyperparameter values across the range of each hyperparameter and randomly combines them across hyperparameters. If the hyperparameter is continuous or discrete with more levels than a requested sample size, a uniform set of samples is taken across the hyperparameter range including a lower and an upper bound. If the hyperparameter is discrete with fewer levels than the requested sample size, each level is repeated an equal number of times across the set of hyperparameter configurations determined by the LHS search method. If a last set of hyperparameter configurations is less than the number of levels, the last set of values for the hyperparameter is uniformly sampled across the set of levels given the remaining set size. The samples for each hyperparameter are randomly shuffled so that the combination of hyperparameters is random—the first values for each hyperparameter are combined, followed by all the second values, etc. This LHS search method ensures that the lower and upper bounds of the hyperparameter tuning range are included, and for discrete hyperparameters with a number of levels less than the requested sample size, the levels are sampled evenly with the possible exception of the last set of values when the number of samples is not evenly divisible by the number of levels. Otherwise, with random selection from n bins, when the number of levels is much less than the requested sample size, the level values are likely to not be sampled uniformly. If the LHS search method is selected, a sample size and a random interval flag may be specified. The sample size defines the number of hyperparameter configurations to evaluate in a single iteration. The random interval flag defines a Boolean option value to randomize samples for continuous hyperparameter values within each LHS interval For illustration, the GA search method defines a family of local search algorithms that seek optimal solutions to problems by applying the principles of natural selection and evolution. A GA search method can be applied to almost any optimization problem and is especially useful for problems for which other calculus-based techniques do not work, such as when the objective function has many local optima, when the objective function is not differentiable or continuous, or when solution elements are constrained to be integers or sequences. In most cases, genetic algorithms require more computation than specialized techniques that take advantage of specific problem structures or characteristics. However, for optimization problems for which no such techniques are available, genetic algorithms provide a robust general method of solution.

There are two competing factors to balance in the selection process of the GA search method: selective pressure and genetic diversity. Selective pressure, the tendency to select only the best hyperparameter values of the current generation to propagate to the next, is used to direct the GA search method to an optimum. Genetic diversity, the maintenance of a diverse solution population, is also used to ensure that the solution space is adequately searched, especially in early iterations. Too much selective pressure can lower the genetic diversity so that the global optimum is overlooked, and the GA search method converges prematurely. Yet, with too little selective pressure, the GA search method might not converge to an optimum in a reasonable amount of computing time. A proper balance between the selective pressure and genetic diversity is maintained so the GA search method converges in a reasonable time to a global optimum. A tournament selection process may be used to randomly choose a group of members from the current population, compare their fitness, and select the fittest from the group to propagate to the next generation. The selective pressure can be controlled by specifying the tournament size, the number of members chosen to compete in each tournament. Members of the current generation that have passed the selection process either go to a crossover operator or are passed unchanged into the next generation based on a pre-defined crossover probability. Members of the current generation that have passed the cross-over process either go to a mutation operator or are passed unchanged into the next generation based on a pre-defined mutation probability. If the GA search method is selected, a population size, a maximum number of generations, a number of global searches, a number of local searches, a heuristic flag, and a maximum number of iterations may be specified where the population size defines the number of hyperparameter configurations to evaluate each iteration. The heuristic flag indicates whether a no clone heuristic should be used.

For illustration, the GSS search method is designed for problems that have continuous variables and have the advantage that, in practice, they often require significantly fewer evaluations to converge than does a GA search method. Furthermore, a GSS search method can provide a measure of local optimality that is very useful in performing multimodal optimization. The GSS search method may add additional "growth steps" to the GA search method whenever the hyperparameter is a continuous variable. For example, a local search selection may include a small subset of hyperparameter values selected based on their fitness score and distance to other hyperparameter values and on pre-existing locally optimal hyperparameter values. A local search optimization may be applied such that the lower and upper bounds of the hyperparameter are modified to temporarily fix integer variables to their current setting. These additional growth steps may be performed each iteration to permit selected hyperparameter configurations of the population (based on diversity and fitness) to benefit from local optimization over the continuous variables. If only integer hyperparameters are present, the GSS search method may not be used to supplement the GA search method. An iteration of the GA search method may be performed before the GSS search method is started to identify additional hyperparameter configurations.

For illustration, the Bayesian search method is based on creating and exploring a kriging surrogate model to search for improved solutions. A Kriging model is a type of interpolation algorithm for which the interpolated values are modeled by a Gaussian process governed by prior covariance values. The basic idea of Kriging is to predict the value of a function at a given point by computing a weighted average of the known values of the function in the neighborhood of the point. The method is mathematically closely related to regression analysis. The results from the previous iteration may be used to generate the initial Kriging model or update the previous Kriging model. The Bayesian search method may be used to generate new hyperparameter configurations (evaluation points) by exploring the model both using the DIRECT solver to find a global optimum of a surrogate model and by generating consecutive LHS points and calculating an acquisition function that accounts for the uncertainty of the surrogate model. If the Bayesian search method is selected, a population size, an initial LHS size for the Kriging model, a maximum number of points in the Kriging model, a number of trial points when optimizing the Kriging model using LHS sampling at each iteration, and a maximum number of iterations may be specified where the population size defines the number of hyperparameter configurations to evaluate each iteration.

For illustration, the DIRECT search method is an implicit branch and bound type algorithm that divides a hyper-rectangle defined by variable bounds into progressively smaller rectangles where the relevance of a given rectangle is based on its diameter and the objective value at the center point. The former is used to quantify uncertainty, the latter is used to estimate the best value within. A pareto-set is maintained for these two quantities and used to select which of the hyper-rectangles to trisect at the next iteration. If the DIRECT search method is selected, an iteration size and a maximum number of iterations may be specified where the iteration size defines the number of hyperparameter configurations to evaluate each iteration. Additional information regarding an illustrative DIRECT search method can be found in D. R. Jones, C. D. Perttunen and B. E. Stuckman, "Lipschitzian Optimization without the Lipschitz Constant," Journal of Optimization Theory and Applications, Vol. 79, No. 1, 1993, pp. 157-181.

For illustration, the Nelder-Mead Simplex search method is a variable shape simplex direct-search optimization method that maintains the objective values of the vertices of a polytope whose number is one greater than the dimension being optimized. It then predicts new promising vertices for the simplex based on current values using a variety of simplex transformation operations. If the Nelder-Mead Simplex search method is selected, an iteration size and a maximum number of iterations may be specified where the iteration size defines the number of hyperparameter configurations to evaluate each iteration. Additional information regarding an illustrative Nelder-Mead Simplex search method can be found in J. A. Nelder and R. Mead, "A Simplex Method for Function Minimization," Computer Journal, Vol. 7, No. 4, 1965, pp. 308-313.

For illustration, the DIRECT/Nelder-Mead Hybrid search method is a tightly coupled hybrid algorithm that uses DIRECT principles to divide and sort the feasible regions into a set of hyper-rectangles of varying dimension based on likelihood of containing a global minimizer. As the hyper-rectangles are divided, the size of the rectangles as measured by the distance between its center and corners reduces. When this size is small enough, a Nelder-Mead optimization is created based on the small hyper-rectangle to further refine the search and the small hyper-rectangle is no longer considered for division. A best value found by a small hyper-rectangle's Nelder-Mead optimizer is used to represent that given rectangle. If the DIRECT/Nelder-Mead Hybrid search method is selected, an iteration size, a maximum number of iterations, and a rectangle size threshold value may be specified. The iteration size defines the number of hyperparameter configurations to evaluate each iteration. The rectangle size threshold value defines a threshold used to determine when the rectangle size is small enough to start Nelder-Mead optimization.

For example, the following statements request creation of a gradient boosting tree model type with the listed target variable and input variables included in the input dataset "mycaslib.dmagecr" with the results stored in "mycaslib.mymodel" where the tuning evaluation parameters include a population size of 5, a maximum of three iterations, the ASE objective function, the default search method, with the "ntrees" hyperparameter selected between 10 and 50 with an initial value of 10, with the "vars_to_try" hyperparameter selected as 4, 8, 12, 16, Or 20 with an initial value of 4, and with the remaining hyperparameters for the gradient boosting tree model type using the default values:

```
proc gradboost data=mycaslib.dmagecr outmodel=mycaslib.mymodel;
    target good_bad / level=nominal;
    input checking duration history amount savings employed installp
        marital coapp resident property age other housing exister job
        depends telephon foreign / level=interval;
    input purpose / level=nominal;
    autotune popsize=5 maxiter=3 objective=ASE
        tuningparameters=(
            ntrees(lb=10 ub=50 init=10)
            vars_to_try(values=4 8 12 16 20 init=4)
        );
```

In an operation 525, a thirteenth indicator may be received that indicates a plurality of variables of the input dataset to define $x_i$. The thirteenth indicator may indicate that all or only a subset of the variables stored in the input dataset be used to define model data 318. For example, the thirteenth indicator indicates a list of variables to use by name, column number, etc. In an alternative embodiment, the thirteenth indicator may not be received. For example, all of the variables may be used automatically. A variable type may also be defined for each variable. Illustrative variable types include interval and nominal. For example, interval may indicate a numeric variable; whereas, nominal indicates a categorical variable. Additionally, depending on the model type selected in operation 512, a target variable of the plurality of variables may be indicated by the thirteenth indicator. For illustration, the neural network model type does not use a target variable; whereas, for the forest model type, a target variable indicates which variable the model predicts. As another option, the target variable may by default be a variable associated with a last column of the input dataset. Depending on the model type selected in operation 512, a minimum number of certain types of variable types may be required. For example, for the factorization machine model type at least two nominal input variables may be required and a target variable of interval type may be required. The factorization machine model type is trained to predict a value of the target variable.

In an operation 526, the tuning evaluation parameters that may include the parameters indicated in operations 502 to 525 are made available to selection manager device 104. For example, the values of any of the parameters that are not default values may be sent to selection manager device 104. As another option, a location of the values of any of the parameters that are not default values may be sent to selection manager device 104.

In an operation 528, a tuning evaluation to select hyperparameters is requested of selection manager device 104 using the tuning evaluation parameters. For illustration, a user at user device 200 may enter the following code into a user interface window presented under control of model tuning application 222 in display 216:

```
cas mysess;
libname mycaslib sasioca casref=mysess;
data mycaslib.dmagecr;
    set sampsio.dmagecr;
run;
proc gradboost data=mycaslib.dmagecr outmodel=mycaslib.mymodel;
    target good_bad / level=nominal;
    input checking duration history amount savings employed installp
        marital coapp resident property age other housing exister job
        depends telephon foreign / level=interval;
    input purpose / level=nominal;
    autotune;
run;
``` where "gradboost" identifies the model type, "data=mycaslib.dmagecr" identifies the input dataset, "outmodel=mycaslib.mymodel" identifies the output location to save the output tables, "target" and "input" define the plurality of variables of the input dataset to define $x_i$, and "autotune" is the request to perform the hyperparameter tuning evaluation.

In an operation 530, tuning evaluation results are accessed. For example, an indicator may be received that indicates that the tuning process is complete. For example, one or more of the output tables may be presented on display 216 when the tuning process is complete. As another option, display 216 may present a statement indicating that the tuning process is complete. The user can then access the output tables in the specified location.

In an operation 532, the user can select hyperparameters from the accessed tuning evaluation results. For example, the user can select the hyperparameters included in the "Best Configuration" output table. As another option, the user can select a hyperparameter configuration included in the "Tuner Results" output table that is less complex, but provides a similar objective function value in comparison to the hyperparameters included in the "Best Configuration" output table.

Figure 18:
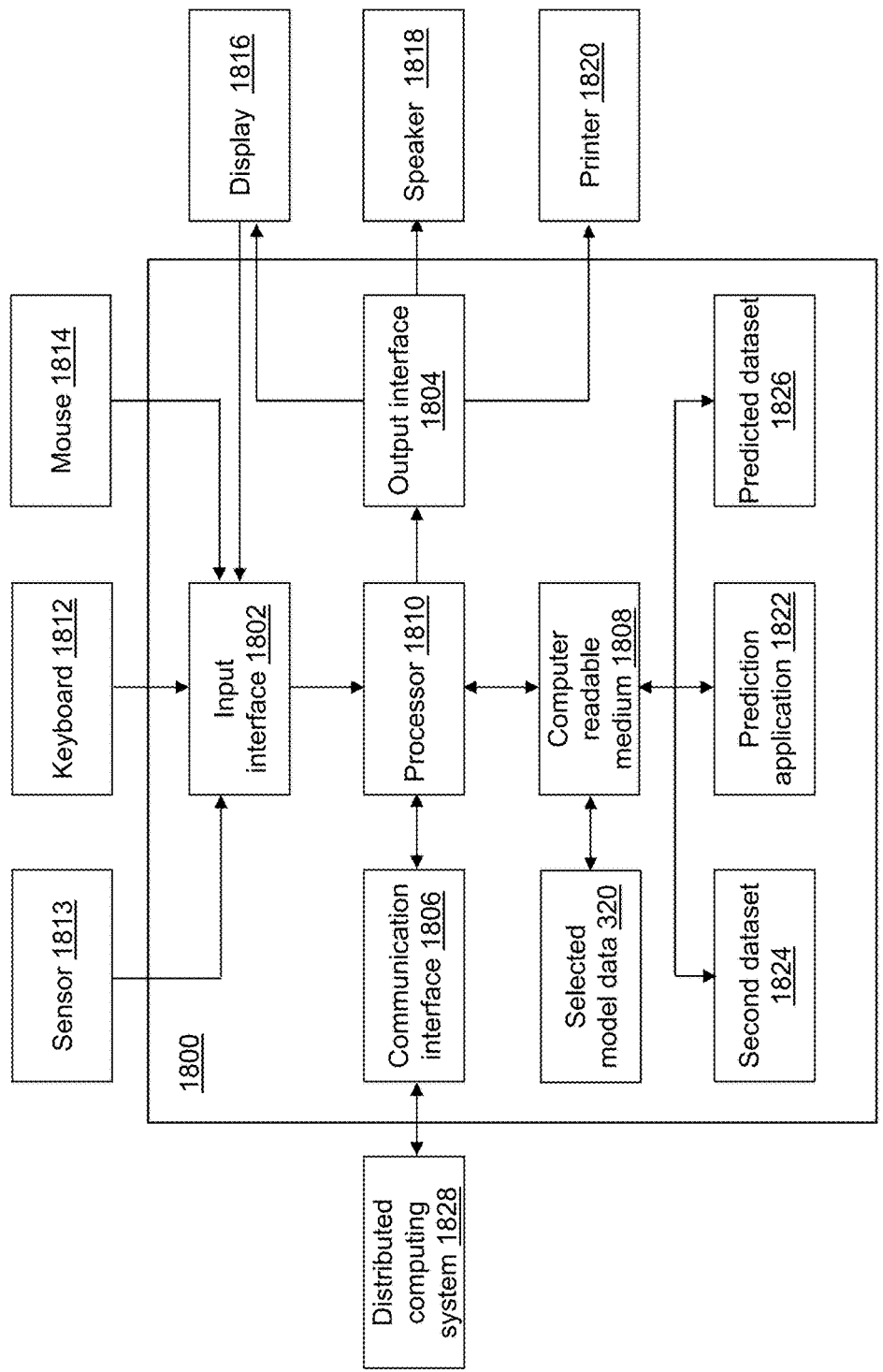
FIG. 18 depicts a block diagram of a prediction device in accordance with an illustrative embodiment.

In an operation 534, the selected hyperparameters may be used to train the selected model type for a second dataset 1824 (shown referring to FIG. 18). In addition or in the alternative, the selected hyperparameters may be used to score second dataset 1824 with selected model data 320.

Figure 6A:
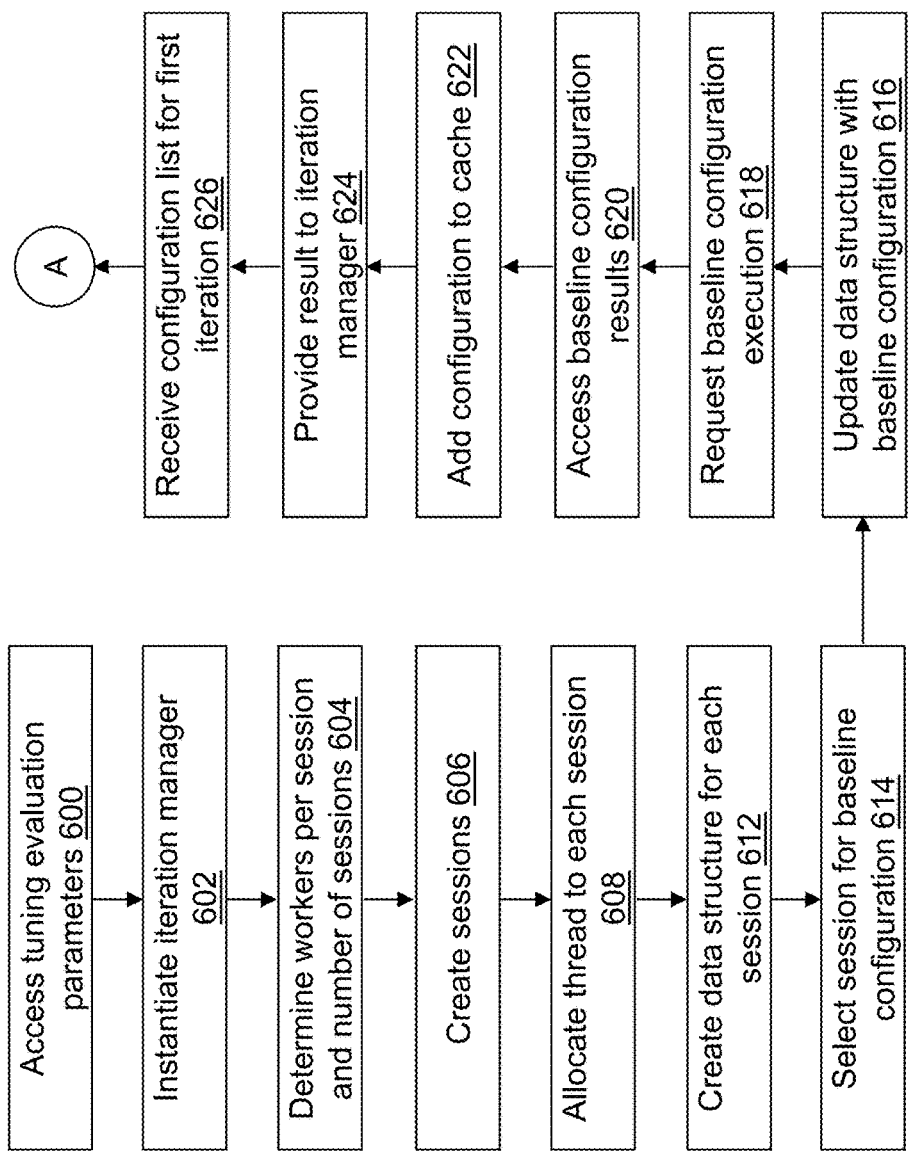
FIGS. 6A to 6C depict a flow diagram illustrating examples of operations performed by the selection manager device of FIG. 3 in accordance with an illustrative embodiment.
Figure 6B:
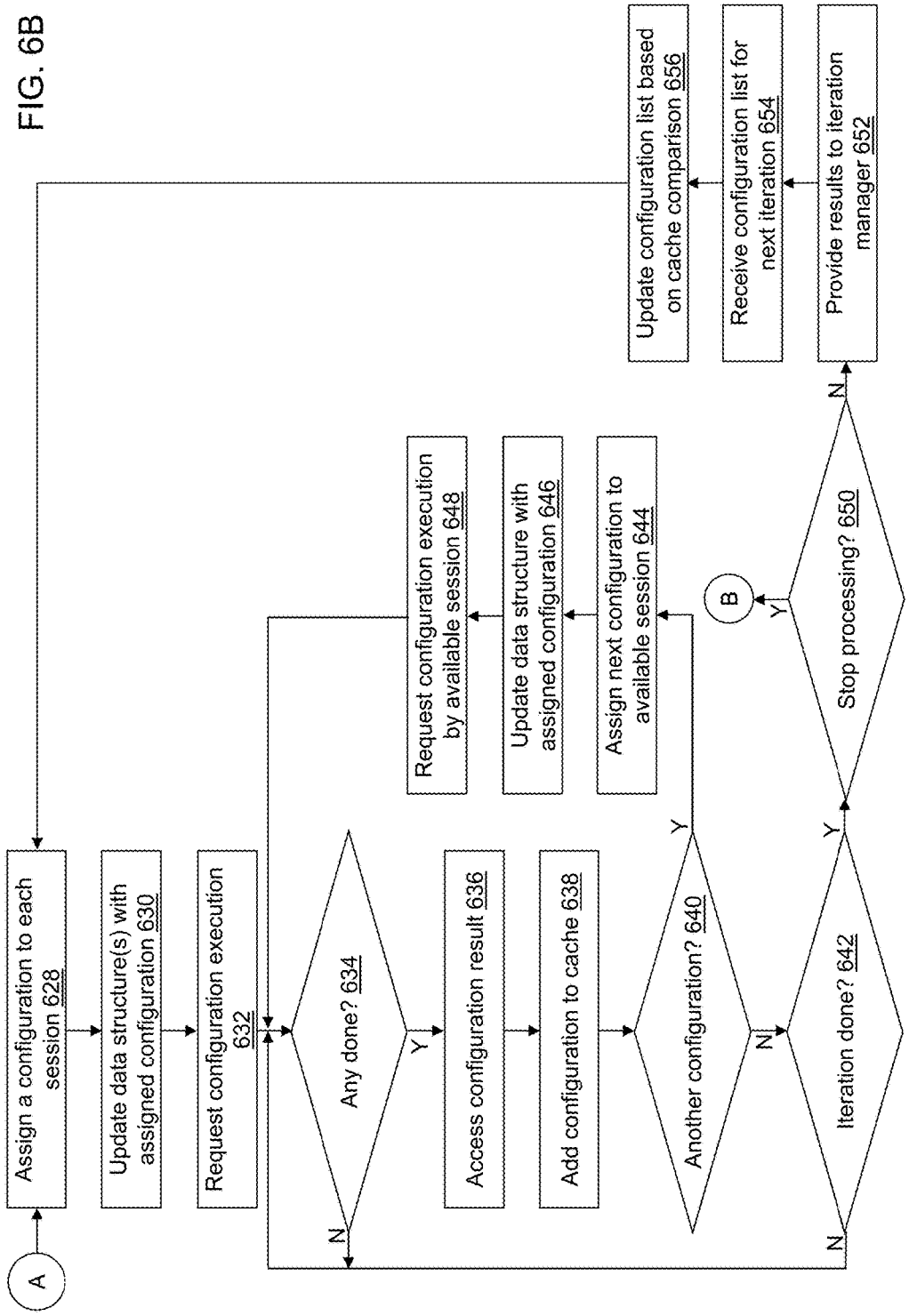
Figure 6C:
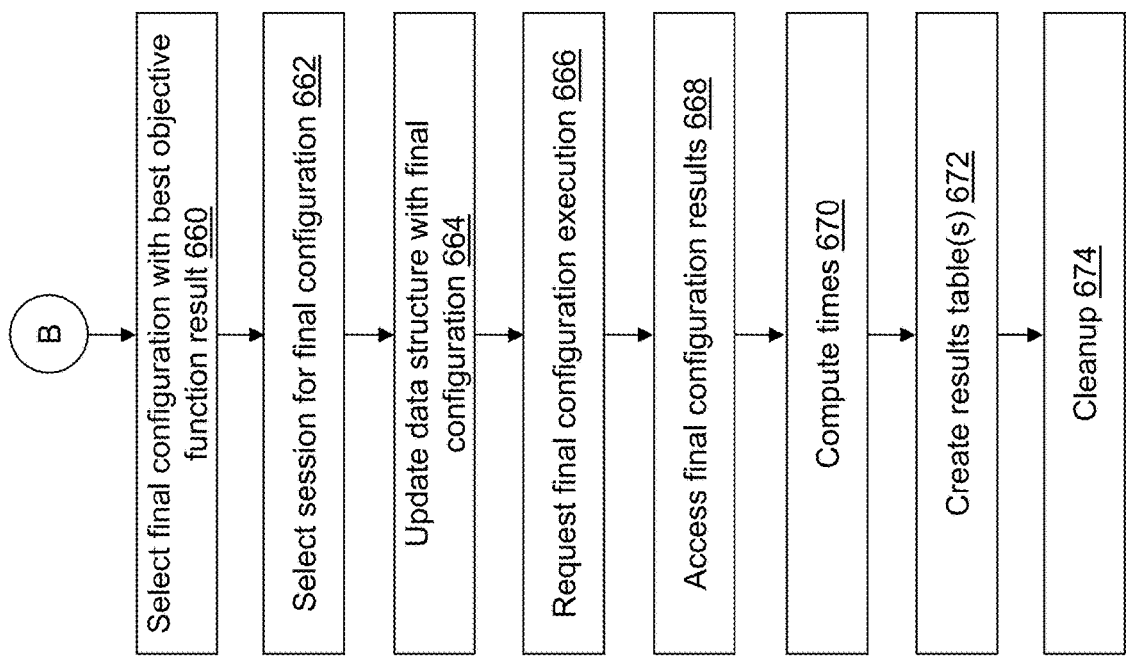

Referring to FIGS. 6A, 6B, and 6C, example operations associated with selection manager application 312 are described. Additional, fewer, or different operations may be performed depending on the embodiment. The order of presentation of the operations of FIGS. 6A, 6B, and 6C is not intended to be limiting. Selection manager device 104 establishes communication with the computing devices of worker system 106, sends instructions to each session manager device 400 associated with each session established by selection manager device 104, collects and aggregates the results of computations from each session, and communicates final results to user device 200. Selection manager device 104 may utilize itself as a worker computing device of worker system 106. The computing devices of worker system 106 receive instructions from selection manager device 104, store and process data, and send the results of computations back to selection manager device 104 under control of each session manager device 400 of each session. Worker computing devices of each session may also communicate to each other directly to complete tasks.

In an operation 600, tuning evaluation parameters obtained by model tuning application 222 are accessed. For example, values for parameters indicated in operations 502 to 525 and made available to selection manager device 104 in operation 526 are accessed.

In an operation 602, iteration manager 314 is instantiated. Iteration manager 314 determines a configuration list 322 that includes a set of hyperparameter configurations to evaluate as described further below. Again, a hyperparameter configuration includes a value for each hyperparameter to evaluate based on the selected model type. A set of hyperparameter configurations includes a plurality of hyperparameter configurations selected for evaluation before a next set of hyperparameter configurations is selected for evaluation based on the tuning search method(s) and the objective function values computed for each hyperparameter configuration.

In an operation 604, the number of workers per session P and the number of sessions n are determined. For example, when the second indicator specifies n, that value is used for the number of sessions, or when the second indicator specifies P, that value is used for the number of workers per session. If W is equal to all of the workers that are connected to selection manager device 104 and there are at least 16 worker computing devices included in worker system 106, n may be limited to eight so that the number of workers per session P is at least two.

Optionally, the second indicator may indicate that P is set based on a size of the input dataset. For example, P may be set based on a number of rows r and a number of columns c of the input dataset and a distribution factor d. For illustration, $P=1+rcd$. An illustrative value of $d=2e^{-8}$ may be used so that another session worker device 420 is added to each session for every 50 million data values. The value of d may be selected by a user of user device 200. The number of columns c further may be the number of variables to include in the training dataset instead of a total number of columns. The number of rows r further may be the number of rows to include in the training dataset instead of a total number of rows.

n may be determined as either one less than a population size specified for the GA tuning search method or the Bayesian search method because one hyperparameter configuration is carried forward each iteration. The best point is carried forward so that if the next iteration does not find an improvement, the returned set of evaluations still includes the current best for consideration in generating the next iteration of hyperparameter configurations. If the GSS tuning search method is selected, twice the number of hyperparameters is added to the value of n. For the LHS, Grid, or Random tuning search methods, n is determined as one less than a sample size. n may then be limited by a configuration of selection manager device 104. When selection manager device 104 is configured in single-machine mode and n is greater than four and not specified by the second indicator, n is limited to four. When selection manager device 104 is configured in single-machine mode and n is specified by the second indicator, n may be limited to 32 or a number of threads of selection manager device 104. When selection manager device 104 is configured in distributed mode, and n is not specified by the second indicator, $n \leq W/P$ may be used. When selection manager device 104 is configured in distributed mode and n is specified by the second indicator, $n \leq 2W/P$ may be applied.

For illustration, if a population size specified for a GA search method is ten, even if W=100 and P=2 based on a size of the input dataset, n=10 instead of n=50 because the GA population size (number of hyperparameter configurations created each iteration by the GA search method) limits the number of hyperparameter configurations created. The user could increase the population size of the GA search method to allow evaluation of more hyperparameter configurations each iteration, if not limited by an administrator. For example, an administrator may define limits so that no single user can use all of the computing devices of worker system 106.

When n is greater than one and P is equal to one, selection manager application 312 is executed in a model parallel mode; when P is greater than one and n is equal to one, selection manager application 312 is executed in a data parallel mode; and when both P and n are greater than one, selection manager application 312 is executed in a data and model parallel mode. In an automatic mode, n may be selected to be as large as possible with P as small as possible subject to the size of the input dataset because model parallel is more efficient than data parallel.

In an operation 606, the number of sessions n are created to include the number of workers per session P with session manager device 400 selected for each created session.

In an operation 608, a thread is allocated from an available thread pool to each created session. The allocated threads each manage the communications between selection manager device 104 and each session manager device 400.

In an operation 612, a data structure is created for each session through which each session is notified of the input dataset, of the hyperparameter values for the assigned hyperparameter configuration, of the model type to train and score, and of other input values for the model type. An illustrative data structure includes a thread identifier that links the data structure to each thread, a session handle for the thread, a parameter list for training with the model type, a data filter for the training dataset based on whether the training mode is using cross validation or a single partition, the hyperparameter values assigned to the thread, a pruning parameter list when a decision tree model type is used, a parameter list for scoring with the model type, a data filter for the validation dataset based on whether the training mode is using cross validation or a single partition, a training time, a scoring time, a total time, a format link, a completion indicator, a number of folds completed indicator, and an extension for reading results. The session handle contains information about the session that was started in a new process to run actions. The training time, the scoring time, the total time, and the completion indicator may be set by session manager device 400 when the evaluation is complete. The format link is added to each data structure if formats were used to define how data is read from the input dataset and is a link to a list of formats defined by the user using model tuning application 222. For example, the user may have specified a variable order and a data type for each variable in operation 525 that is passed to session manager device 400.

In an operation 614, a session is selected to execute a baseline hyperparameter configuration used as a baseline. The baseline hyperparameter configuration may be associated with an iteration zero.

In an operation 616, the data structure associated with the selected session is loaded with the baseline hyperparameter configuration. For example, the parameter list for training with the model type, the data filter for the training dataset, the default or baseline hyperparameter values, optionally the pruning parameter list, the parameter list for scoring with the model type, and the data filter for validation dataset 322 are defined in the data structure linked to the selected session.

In an operation 618, the selected session is requested to execute the baseline hyperparameter configuration based on the parameter values in the data structure. The handle to the session process stored in the data structure associated with the selected session may be used to make this request or call. A first objective function value is obtained by using either single partition validation or k-fold cross validation depending on the user validation selection.

In an operation 620, results generated from the baseline hyperparameter configuration are accessed. For example, the results may be received from the selected session or accessed in a global table, etc. The extension pointer stored in the data structure associated with the selected session is a pointer to a set of utility functions that support parsing of tabular results created by actions in an internal format. The objective function value for each hyperparameter configuration may be extracted from an in-memory table created by an action called for validation of the trained model. The results may be extracted from an in-memory "blob" and converted to tabular form using the extension pointer.

In an illustrative embodiment, a train request is sent to session manager device 400 of the selected session to execute the "train" action based on the selected model type. After receiving an indication that the "train" action is complete from session manager device 400, a score request is sent to session manager device 400 of the selected session to execute the "score" action based on the selected model type. After each request, a series of "get response from session" calls may be made until a "done/complete" response is received. Each response obtained from the "get response" calls is compiled into a response object using the thread allocated to the selected session. After the responses are compiled, a result is extracted from the response depending on the type of objective function selected where an associated table may be found in the results object and from which a value computed for the objective function is read. The objective function value is provided back to the main thread on which selection manager application 312 is instantiated and associated with the set of hyperparameter values (in this case, the baseline configuration) assigned to the selected session.

In an operation 622, the results are stored in evaluation cache 316 and in model data 318 in association with the set of hyperparameter values.

In an operation 624, the results are provided to iteration manager 314. Based on the baseline results and hyperparameters, iteration manager 314 determines a first set of hyperparameter configurations to evaluate in a first iteration. Again, each hyperparameter configuration includes a specific value for each hyperparameter based on the selected model type. For example, iteration manager 314 executes a first tuning search method of the tuning search method specified in operation 522. Alternatively, multiple tuning search methods may be executed concurrently such that iteration manager 314 executes each tuning search method to determine a set of hyperparameters that are combined to define the first set of hyperparameter configurations. For illustration, the LHS, the Random, and/or the Grid search methods may be used in a first iteration to define the first set of hyperparameter configurations that sample the search space. The initial configuration list 322 is also called a "population".

In an operation 626, a configuration list 322 is received that includes the first set of hyperparameter configurations generated by iteration manager 314.

Referring to FIG. 6B, in an operation 628, each hyperparameter configuration is selected from configuration list 322 and assigned to a session. For example, if the model type is support vector machine, a first value for the penalty parameter C and a second value for the degree parameter is assigned as a pair to a session with different values for the pair assigned to different sessions. Iteration manager 314 defined the pair of values for each hyperparameter configuration included in configuration list 322.

In an operation 630, the data structure associated with the selected session is loaded with the assigned hyperparameter configuration. For example, the parameter list for training with the model type, the data filter for the training dataset, the assigned hyperparameter values, optionally the pruning parameter list, the parameter list for scoring with the model type, and the data filter for validation dataset 322 are defined in the data structure linked to the selected session.

In an operation 632, a request is sent to each session manager device 400 to execute model train/score manager application 412 and/or model/train worker application 422 with the assigned hyperparameter configuration included in the created data structure. Again, as discussed previously, separate train and score request may be made. If cross validation is performed, there may be multiple train and score requests based on a number of folds.

In an operation 634, a determination is made concerning whether or not any execution is done. For example, session manager device 400 may set the completion indicator to indicate done in the data structure associated with it. If no execution is done, processing continues in operation 634 until indication that a session is done is received. If any execution is done, processing continues in an operation 636. For illustration, selection manager device 104 loops through each of its thread handles, checking to see if that particular thread is busy or free. When a session finishes evaluating its assigned hyperparameter configuration, session manager device 400 returns the computed values back to selection manager device 104 and sets its completion indicator indicating that it is free to receive a new hyperparameter configuration for evaluation.

Similar to operation 620, in operation 636, results generated by the now free session are accessed.

In an operation 638, the hyperparameter configuration and the configuration results are stored in evaluation cache 316 and in model data 318.

In an operation 640, a determination is made concerning whether or not configuration list 322 includes another hyperparameter configuration to evaluate that has not been assigned to a session. If configuration list 322 includes another hyperparameter configuration to evaluate, processing continues in an operation 644. If configuration list 322 does not include another hyperparameter configuration to evaluate, processing continues in an operation 642.

In operation 642, a determination is made concerning whether or not the iteration is done such that each hyperparameter configuration on configuration list 322 has been evaluated. If the iteration is done, processing continues in an operation 650. If the iteration is not done, processing continues in operation 634 to continue to wait for sessions to complete execution with their assigned hyperparameter configuration.

In operation 644, a next hyperparameter configuration is selected from configuration list 322 and assigned to the now free session.

In an operation 646, the data structure associated with the now free session is loaded with the next assigned hyperparameter configuration.

In an operation 648, a request is sent to session manager device 400 associated with the now free session to execute model train/score manager application 412 and/or model/train worker application 422 with the hyperparameter configuration included in the data structure, and processing continues in operation 634 to continue to monitor for sessions that have completed their assigned hyperparameter configuration evaluation.

In operation 650, a determination is made concerning whether or not processing should be stopped. If processing should be stopped, processing continues in an operation 660 shown referring to FIG. 6C. If processing should not be stopped, processing continues in an operation 652. For example, processing is terminated when a maximum number of iterations have been performed, when a maximum number of hyperparameter configuration evaluations have been performed, when a maximum time (computing time or wall clock time) has been exceeded, etc. As another option, processing is terminated if the current tuning search method(s) have each completed based on the parameters defined for each search method in operation 524. For example, a maximum number of iterations may have been exceeded by each of the current tuning search method(s).

In operation 652, the results for each hyperparameter configuration included in configuration list 322 is provided to iteration manager 314. Based on the results and the current tuning search method(s), iteration manager 314 determines a next set of hyperparameter configurations to evaluate in a next iteration. The best model hyperparameter configurations from the previous iteration are used to generate the next population of hyperparameter configurations to evaluate with the selected mode type. If multiple search methods are running concurrently, the results from all of the hyperparameter configurations include in configuration list 322 as part of the current iteration are used to determine the next population irrespective of whether or not that search method requested evaluation of a specific hyperparameter configuration. This process is repeated for remaining iterations based on the search method(s) chosen. In this manner, a search method gains information based on one or more hyperparameter configurations generated by another search method.

For example, iteration manager 314 executes a next tuning search method of the tuning search method specified in operation 524. For illustration, after a first iteration, a GA search method and/or a Bayesian search method may be used by iteration manager 314 to determine the next set of hyperparameter configurations. Each population of the GA search method may be enhanced with a "growth step" in which a GSS is used to locally improve some of the more promising members of the GA population.

Iteration manager 314 makes sure that all of the computing devices of worker system 106 are used as efficiently as possible by balancing the workload across the available computing devices of worker system 106 thereby reducing a computation time for the hyperparameter configurations selected by each search method.

In an operation 654, configuration list 322 is received that includes a next plurality of hyperparameter configurations for a next iteration.

In an operation 656, configuration list 322 is updated based on a comparison of each hyperparameter configuration included in configuration list 322 with each hyperparameter configuration included in evaluation cache 316, and processing continues in operation 628 to evaluate the remaining hyperparameter configurations included in configuration list 322 for the next iteration. For example, each hyperparameter configuration in configuration list 322 is compared to previously evaluated hyperparameter configurations to determine if they are "close enough" to hyperparameter configuration values that have already been evaluated, where "close enough" is evaluated based on the cache tolerance value. If so, the hyperparameter configuration is removed from configuration list 322 to avoid expending computing resources reevaluating a too similar hyperparameter configuration. The objective function value of the "close" point may be defined as the objective function value of the point removed from configuration list 322 in evaluation cache 316.

For illustration, the following code performs the comparison using the C programming language:

```
/*** Compare the vector of values for two given points returning one of
three possible values:
*       1: point1 > point2
*      -1: point1 < point2
*       0: point1 = point2 (with respect to tolerance)
*
* @param[in] x1         pointer to first point to compare
* @param[in] x2         pointer to second point to compare
* @param[in] tolerance  cache tolerance value
* @param[in] scaling    vector of scaling factor values used to scale
                        each x value
* @param[in] nx         number of values in x vector
                        (# hyperparameters)
*/
static int tklsoCompareDoublePoints(double x1[ ], double x2[ ], double
    tolerance, double *scaling, int nx)
{
  int i;
  for (i=0; i<nx; i++) {
    if (fabs(x1[i] − x2[i]) > (scaling[i] * tolerance)) {
      // points are unequal with respect to cache tolerance value
      if ((x1[i] − x2[i]) > (scaling[i] * tolerance)) {
        // point1 > point2
        return 1;
      } else {
        // point1 < point2
        return −1;
      }
    }
  }
}
```

-continued

```
    // points are equal with respect to cache tolerance value
    return 0;
}
```

Evaluation cache 316 allows the hyperparameter tuning process to remain efficient by only evaluating "close" points once. Evaluation cache 316 may be implemented as a splay tree so that the points that are most recently added are near the root of the tree. This means that if two tuning search methods submit the same point at the same time, the first one is added to the splay tree and the lookup of the second point is quick because the first one is near the tree's root.

Referring to FIG. 6C, in operation 660, a final hyperparameter configuration is selected based on the hyperparameter configuration that generated the best or lowest objective function value.

In an operation 662, a session is selected to execute the final hyperparameter configuration.

In an operation 664, the data structure associated with the selected session is updated with the final hyperparameter configuration.

Similar to operation 618, in an operation 666, the selected session is requested to execute the final hyperparameter configuration based on the parameter values in the data structure. In an illustrative embodiment, a train request is sent to session manager device 400 of the selected session to execute the "train" action based on the selected model type. After receiving an indication that the "train" action is complete from session manager device 400, a series of "get response from session" calls may be made until a "done/complete" response is received. Each response obtained from the "get response" calls is compiled into a response object using the thread allocated to the selected session. Characteristics that define the trained model using the final hyperparameter configuration are provided back to the main thread on which selection manager application 312 is instantiated. For example, the ASTORE procedure may be used to store the trained model for use in predicting a target value for a new observation vector included in new data such as second dataset 1824.

Similar to operation 620, in an operation 668, results generated from the final hyperparameter configuration are accessed.

In an operation 670, computation times used to perform the hyperparameter tuning are computed for example, using the training time, the scoring time, and the total time included in the data structure associated with each session manager device 400 that contains times for the model train and score executions for that session. The wall clock time may also be computed. By dividing the sum of all objective evaluation times across all sessions by the wall clock time, a 'parallel speed up' time savings can be estimated and returned with the results.

In an operation 672, results tables are created. For example, the results tables indicated in operation 508 are created and returned to or otherwise made accessible by user device 200.

In an operation 674, session cleanup is performed. For example, the sessions are closed, the created data structures are cleared and released, and all memory is freed.

Figure 7A:
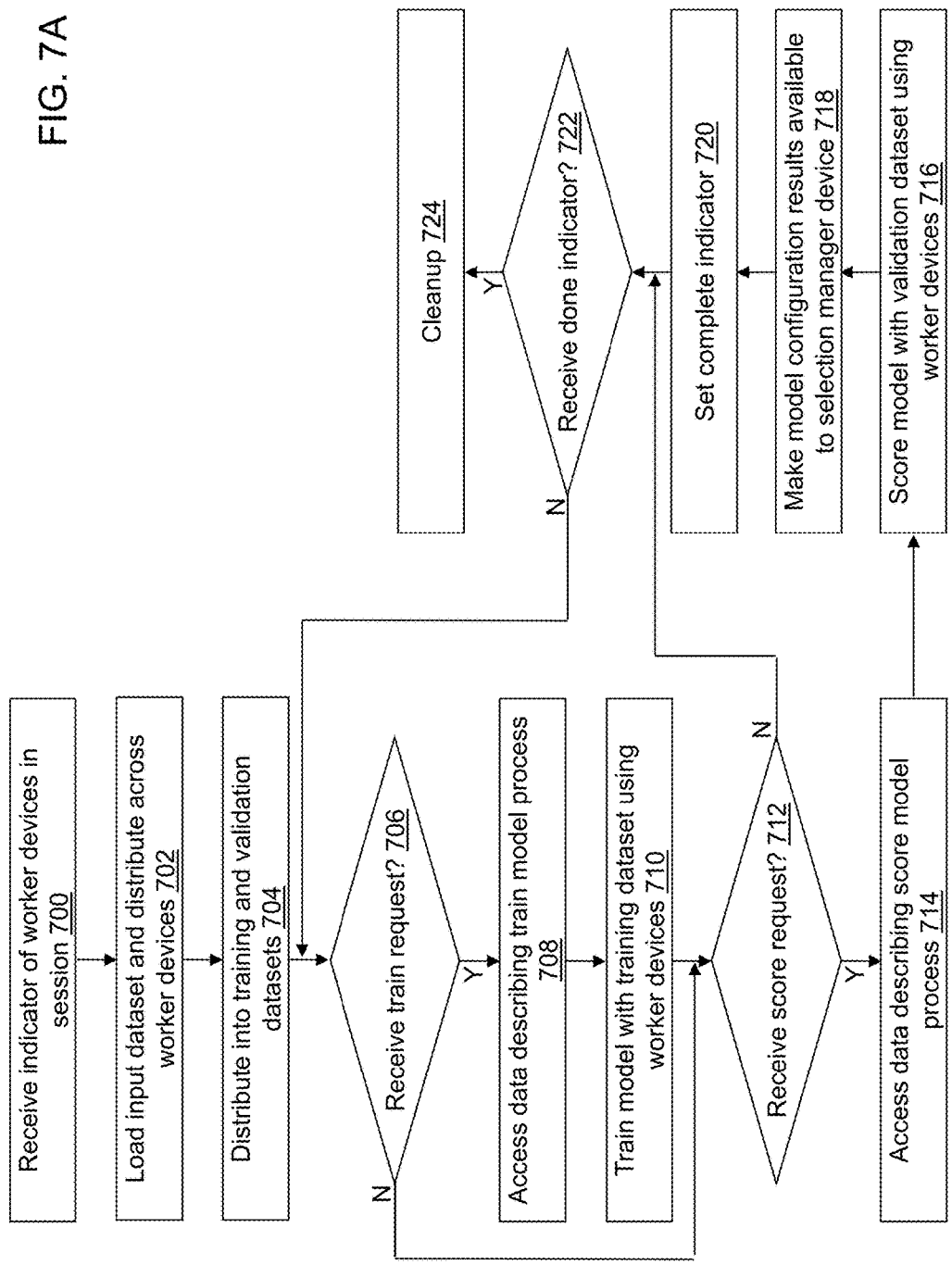
FIGS. 7A and 7B depict a flow diagram illustrating examples of operations performed by the session manager device of FIG. 4 in accordance with an illustrative embodiment.
Figure 7B:
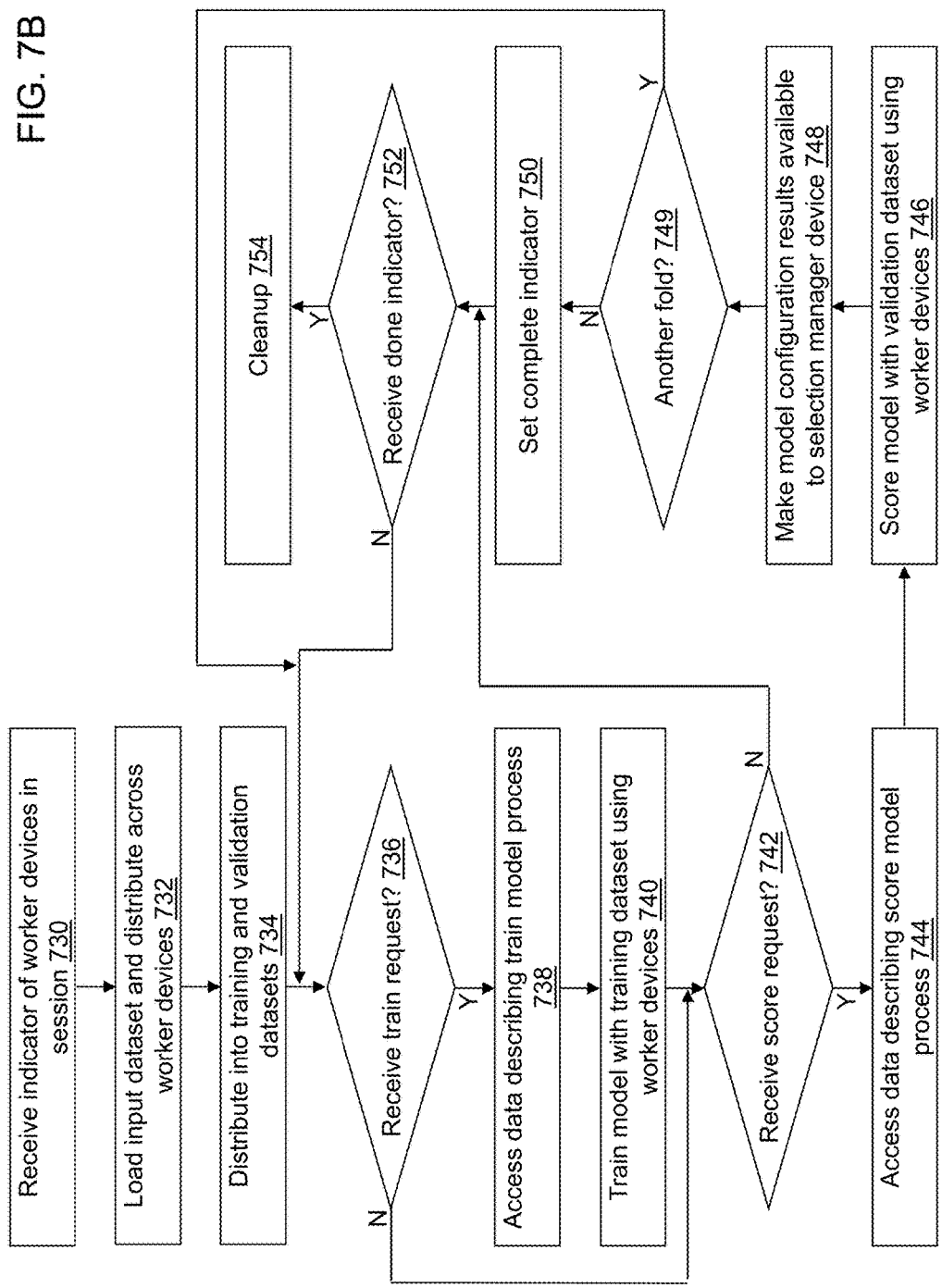

Referring to FIGS. 7A and 7B, example operations associated with model train/score manager application 412 are described. Additional, fewer, or different operations may be performed depending on the embodiment. The order of presentation of the operations of FIGS. 7A and 7B is not intended to be limiting. FIG. 7A shows operations associated with a single partition between training dataset subset 434 and validation dataset subset 436; whereas, FIG. 7B shows operations associated with a k-folds or partitions to form training dataset subset 434 and validation dataset subset 436.

Referring to FIG. 7A, in an operation 700, an indicator of worker devices in the session to which session manager device 400 is assigned is received from selection manager device 104.

In an operation 702, the input dataset is loaded and distributed across the computing devices of the session such that each computing device is loaded with a portion of the input dataset.

In an operation 704, the portion of the input dataset distributed to each computing device of the session is distributed into training dataset subset 434 and validation dataset subset 436 at each session worker device 420 of the session and optionally into training dataset subset 414 and validation dataset subset 416 at session manager device 400. For example, session manager device 400 may request that each session worker device 420 create training dataset subset 434 and validation dataset subset 436 as a single-partition based on the fraction value indicated in operation 510. In this process, session manager device 400 may also partition its portion of the input dataset into training dataset subset 414 and validation dataset subset 416. For illustration, if fraction value is 0.3 or 30%, 30% of the observation vectors in the portion of the input dataset at each session worker device 420 of the session is extracted to create validation dataset subset 436 and the remaining 70% of the observation vectors in the portion of the input dataset at each session worker device 420 of the session forms training dataset subset 434. Similarly, if session manager device 400 also hosts a portion of the input dataset, 30% of the observation vectors in the portion of the input dataset at session manager device 400 is extracted to create validation dataset subset 416 and the remaining 70% of the observation vectors in the portion of the input dataset at session manager device 400 forms training dataset subset 414.

In an operation 706, a determination is made concerning whether or not a train request to perform training is received from selection manager device 104. If a train request is received, processing continues in an operation 708. If a train request is not received, processing continues in operation 712.

In operation 708, the data describing the train model process including the hyperparameter configuration is accessed. For example, data in the data structure associated with the thread is accessed.

In an operation 710, the model type is trained using the hyperparameter configuration accessed and training dataset subset 434 at each session worker device 420 and optionally training dataset subset 414 at session manager device 400.

In operation 712, a determination is made concerning whether or not a score request to perform scoring is received from selection manager device 104. If a score request is received, processing continues in an operation 714. If a score request is not received, processing continues in operation 722.

In operation 714, the data describing the score model process including the hyperparameter configuration is accessed. For example, data in the data structure associated with the thread is accessed.

In an operation 716, the model type is scored using the hyperparameter configuration accessed, the trained model defined in operation 710, and validation dataset subset 436 at each session worker device 420 and optionally validation dataset subset 416 at session manager device 400 to determine one or more objective function values based on the objective function indicated.

In an operation 718, the model configuration results are made available to selection manager device 104, for example, by including them in the data structure and/or updating a globally accessible table and/or storing them in model configuration data 418.

In an operation 720, the completion indicator of the data structure is set to notify selection manager device 104 that processing of the hyperparameter configuration is complete.

In operation 722, a determination is made concerning whether or not processing is stopped. For example, a done indicator may be received from selection manager device 104. If processing is stopped, processing continues in an operation 724. If processing is not stopped, processing continues in operation 706 when a new train request is received from selection manager device 104.

In operation 724, cleanup is performed.

Referring to FIG. 7B, similar to operation 700, in an operation 730, an indicator of worker devices in the session to which session manager device 400 is assigned is received from selection manager device 104.

Similar to operation 702, in an operation 732, the input dataset is loaded and distributed across the computing devices of the session such that each computing device is loaded with a portion of the input dataset.

In an operation 734, the portion of the input dataset distributed to each computing device of the session is distributed into a plurality of training dataset subsets 434 and validation dataset subset 436 at each session worker device 420 of the session and optionally into a plurality of training dataset subsets 414 and validation dataset subset 416 at session manager device 400. For example, session manager device 400 may request that each session worker device 420 create training dataset subsets 434 and validation dataset subset 436 from multiple partitions based on the number of folds F defined for cross-validation and indicated in operation 510. F−1 partitions form F−1 training dataset subsets 434 with the remaining partition forming validation dataset subset 436.

As discussed previously, using cross validation, each model evaluation requires F−1 training and scoring executions with different training dataset subsets. For example, if the number of folds value F=4, each session worker device 420 partitions its portion of the input dataset into four subsets A, B, C, D. For a first execution loop, a first partition (e.g., A) is selected to form a first training dataset subset 434 at each session worker device 420 with a fourth partition D selected to form validation dataset subset 436. For a second execution loop, a second partition (e.g., B) is selected to form a second training dataset subset 434 at each session worker device 420 with the fourth partition D again forming validation dataset subset 436. For a third execution loop, a third partition (e.g., C) is selected to form a third training dataset subset 434 at each session worker device 420 with the fourth partition D again forming validation dataset subset 436. Thus, the training and scoring process is repeated F−1 times with different training datasets used to define the trained model and the same validation dataset used to determine scoring performance. The partitions may similarly be formed at session manager device 400 if a portion of the input dataset is stored to computer-readable medium 208.

Similar to operation 706, in an operation 736, a determination is made concerning whether or not a train request to perform training is received from selection manager device 104. If a train request is received, processing continues in an operation 738. If a train request is not received, processing continues in operation 742.

Similar to operation 708, in an operation 738, the data describing the train model process including the hyperparameter configuration is accessed. For example, data in the data structure associated with the thread is accessed, and the training dataset subset 434 for the current fold is selected.

Similar to operation 710, in an operation 740, the model type is trained using the hyperparameter configuration accessed and training dataset subset 434 associated with the current fold number at each session worker device 420. Again, training dataset subset 414 associated with the current fold number at session manager device 400 may also be used.

Similar to operation 712, in an operation 742, a determination is made concerning whether or not a score request to perform scoring is received from selection manager device 104. If a score request is received, processing continues in an operation 744. If a score request is not received, processing continues in operation 752.

Similar to operation 714, in an operation 744, the data describing the score model process including the hyperparameter configuration is accessed. For example, data in the data structure associated with the thread is accessed.

Similar to operation 716, in an operation 746, the model type is scored using the hyperparameter configuration accessed, the trained model defined in operation 710, and validation dataset subset 436 at each session worker device 420 and optionally validation dataset subset 416 at session manager device 400 to determine one or more objective function values based on the objective function indicated.

Similar to operation 718, in an operation 748, the model configuration results are made available to selection manager device 104, for example, by including them in the data structure and/or updating a globally accessible table and/or storing them in model configuration data 438. The number of folds completed indicator may be updated to notify selection manager device 104 that processing of a specific fold is complete.

In an operation 749, a determination is made concerning whether or not the F−1 folds have been processed. If the F−1 folds have been processed, processing continues in an operation 750. If the F−1 folds have not been processed, processing continues in operation 736 to process the next partition of training dataset subset 434 and optionally training dataset subset 414.

Similar to operation 720, in an operation 750, the completion indicator of the data structure is set to notify selection manager device 104 that processing of the hyperparameter configuration is complete. The objective function value(s) computed in operation 746 for each of the F−1 folds is averaged to obtain a single error estimate value.

Similar to operation 722, in an operation 752, a determination is made concerning whether or not processing is stopped. For example, a done indicator may be received from selection manager device 104. If processing is stopped, processing continues in an operation 754. If processing is not stopped, processing continues in operation 736 when a new train request is received from selection manager device 104.

Similar to operation 724, in an operation 754, cleanup is performed.

Figure 8C:
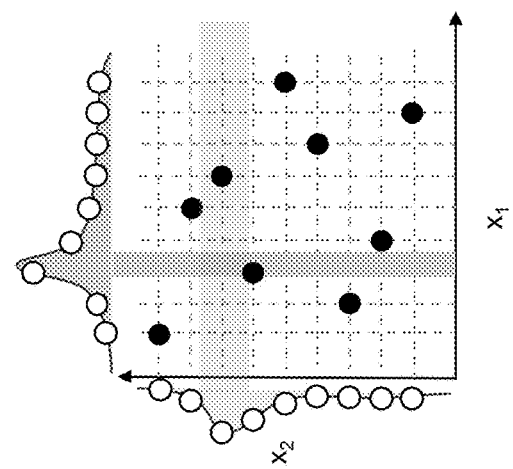
FIGS. 8A to 8C depict a grid, a random grid, and a Latin hypercube sample grid, respectively, in accordance with an illustrative embodiment.
Figure 8B:
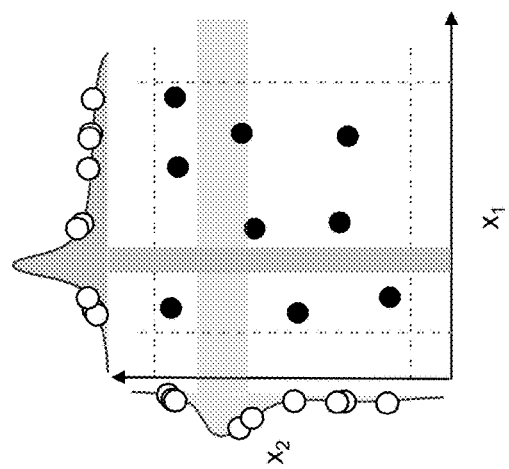
Figure 8A:
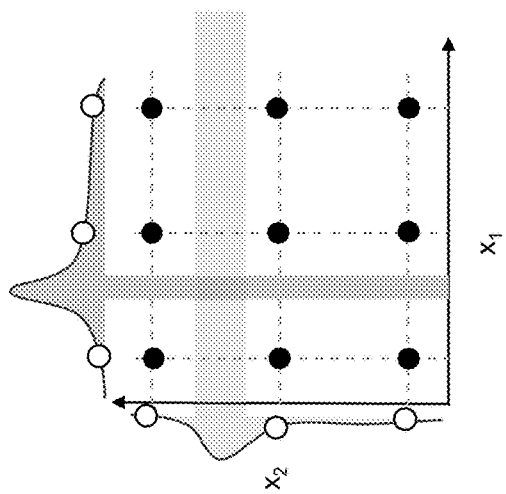

Referring to FIG. 8A, a grid search approach to exploring alternative hyperparameter configurations is shown in accordance with an illustrative embodiment. Each hyperparameter of interest is discretized into a desired set of values to be evaluated, and models are trained and assessed for all combinations of the values across all hyperparameters (that is, a "grid"). Although fairly simple and straightforward to carry out, a grid search is quite costly because expense grows exponentially with the number of hyperparameters and the number of discrete levels of each. FIG. 8A illustrates hypothetical distributions of two hyperparameters denoted $X_1$ and $X_2$ with respect to a training objective and depicts the difficulty of finding a good combination with a coarse standard grid search. The grayed areas indicate a region of statistically better values of the respective hyperparameter. The hyperparameter values selected for model training and scoring (performance assessment) are indicated by dots within the grid. In the illustration, none of the grid selections are within the grayed region for either hyperparameter.

Referring to FIG. 8B, a random grid search approach to exploring alternative hyperparameter configurations is shown in accordance with an illustrative embodiment. Given the disparity in the sensitivity of model accuracy to different hyperparameters, a set of candidates that incorporates a larger number of trial values for each hyperparameter may have a much greater chance of finding effective values for each hyperparameter. Because some of the hyperparameters might actually have little to no effect on the model for certain datasets, it is prudent to avoid wasting the effort to evaluate all combinations, especially for higher-dimensional hyperparameter spaces. Rather than focusing on studying a full-factorial combination of all hyperparameter values, studying random combinations enables exploration of more values of each hyperparameter at the same cost (the number of candidate models that are trained and scored). FIG. 8B depicts a potential random distribution with the same budget of evaluations (nine hyperparameter configurations in this example) as shown for the grid search in FIG. 8A, highlighting the potential to find better hyperparameter values. Nevertheless, the effectiveness of evaluating purely random combinations of hyperparameter values is subject to the size and uniformity of the sample; candidate combinations can be concentrated in regions that completely omit the most effective values of one or more of the hyperparameters.

Referring to FIG. 8C, the LHS search method approach to exploring alternative hyperparameter configurations is shown in accordance with an illustrative embodiment. LHS samples are exactly uniform across each hyperparameter, but random in combinations. See, for example, a paper by M. D. McKay titled "Latin Hypercube Sampling as a Tool in Uncertainty Analysis of Computer Models" and published In Proceedings of the 24th Conference on Winter Simulation (WSC 1992), edited by J. J. Swain, D. Goldsman, R. C. Crain, and J. R. Wilson, 557-564. New York: ACM (1992), for more information. LHS samples are approximately equidistant from one another in order to fill the space efficiently. This sampling allows for coverage across an entire range of each hyperparameter and is more likely to find good values of each hyperparameter, as illustrated in FIG. 8C, which can be used to identify good hyperparameter combinations.

Figure 9C:
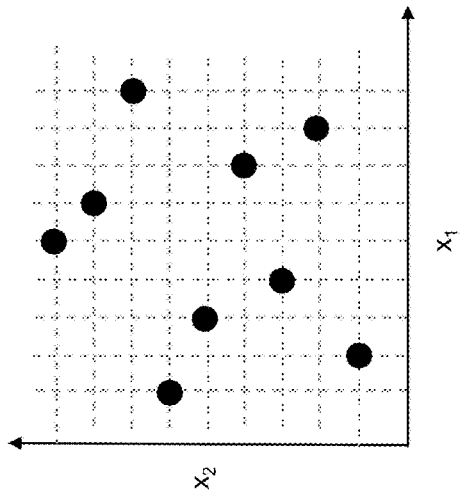
FIGS. 9A to 9C depict a plurality of Latin hypercube sample grids in accordance with an illustrative embodiment.
Figure 9B:
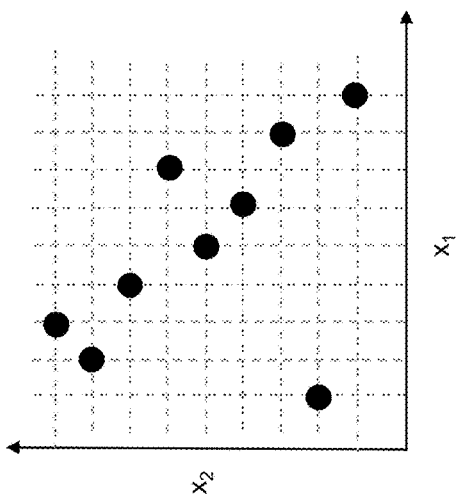
Figure 9A:
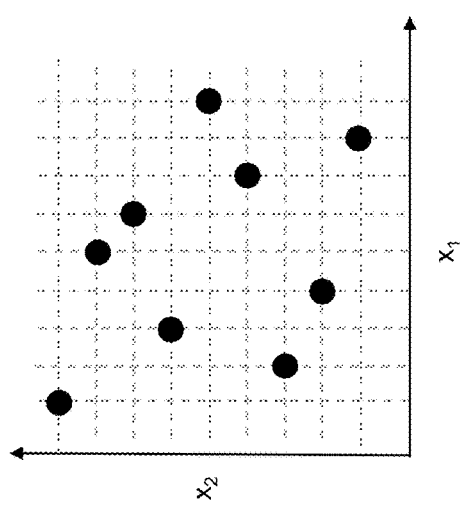

Referring to FIG. 9A, a first set of LHS hyperparameter configurations is shown for illustration. Referring to FIG. 9B, a second set of LHS hyperparameter configurations is shown for illustration. Referring to FIG. 9C, a third set of LHS hyperparameter configurations is shown for illustration.

Figure 10:
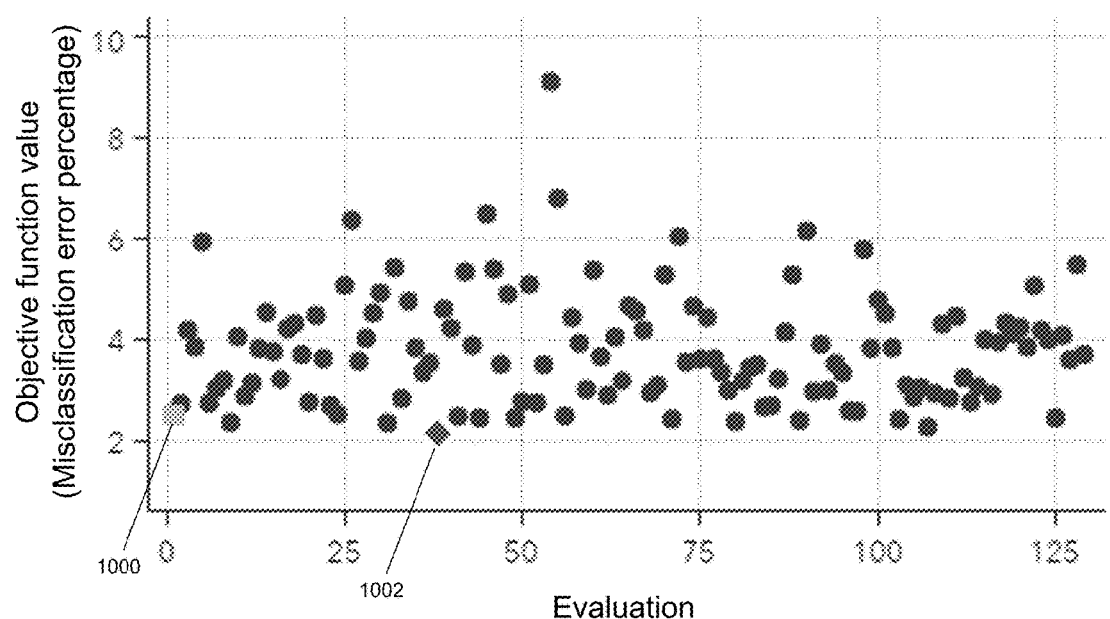
FIG. 10 shows an objective function value computed for a plurality of hyperparameter configuration evaluations computed by the hyperparameter selection system of FIG. 1 in accordance with an illustrative embodiment.

Referring to FIG. 10, objective function values computed using a mixed National Institute of Standards and Technologies (MNIST) database of handwritten digits (produced by Y. LeCun et al., and titled "The MNIST Database of Handwritten Digits") as the input dataset are shown where a gradient boosting tree model type was used. The MNIST database contains digitized representations of handwritten digits 0-9, in the form of a 28×28 image for a total of 784 pixels. Each digit image is an observation (row) in the dataset with a column for each pixel containing a grayscale value for that pixel. The database includes 60,000 observations selected to form the training dataset and 10,000 observations selected to form the validation dataset. The GRADBOOST procedure was applied to the digits database with tuning according to the configuration specified by the following statements:

```
proc gradboost data=mycaslib.digits;
   partition rolevar=validvar(train='0' valid='1');
   input &inputnames;
   target label / level=nominal;
   autotune popsize=129 maxiter=20 maxevals=2560
      nparallel=32 maxtime=172800 tuningparameters=(ntrees(ub=200));
run;
```

In this example, the training and validation datasets were combined using a "rolevar=" option specifying the variable that indicates which observations to use during training and which to use during scoring for validation. The "partition" statement was used in conjunction with the "autotune" statement to specify a single partition validation approach, but using the "rolevar=" option instead of using random selection of the fraction value to form the validation dataset. Because there are 784 potential inputs (pixels) and some of the pixels were blank for all observations, the list of input pixels that are not blank was preprocessed into a macro variable "&inputnames" resulting in 719 inputs. Up to 20 iterations were requested, with a population size (number of configurations per iteration) of 129. One configuration was carried forward each iteration, so this specification results in up to 128 new hyperparameter configurations evaluated each iteration.

A grid with 142 computing devices in worker system 106 was employed and configured to use four session worker devices 420 per session organized into 32 sessions. There is a trade-off between training time and tuning time. Using four session worker devices 420 per session to train and tune 32 models in parallel used 128 worker computing devices in total. In the illustrative execution, it was decided that the gain from doubling the number of sessions was larger than the reduced training time from doubling the number of session worker devices 420 per session. Using four session worker devices 420 per session, the training time for a default gradient boosting tree model type was approximately 21.5 minutes. With eight session worker devices 420 per session, the training time was approximately 13 minutes.

With up to 20 iterations and 128 hyperparameter configurations per iteration, the maximum number of evaluations input was set equal to 2,560. The maximum execution time was increased to support up to 48 hours of tuning time. The upper bound on the tuning range for the number of trees hyperparameter was increased to 200 from a default value of 150. Default settings were used for the other five hyperparameters for the gradient boosting tree model type.

Some of the challenges of hyperparameter tuning discussed earlier can be seen referring to FIG. 10, which shows the error for the hyperparameter configurations evaluated in the first iteration of tuning that used LHS to obtain an initial sample of the space. The majority of the evaluated hyperparameter configurations produced a validation error larger than that of the default configuration and shown as default value 1000, which is 2.57%. Numerous different hyperparameter configurations produced very similar error rates. These similar error rates indicate flat regions in the space, which are difficult for an optimizer to traverse and make it difficult for random hyperparameter configurations to identify an improved model. An improved model was found in the first iteration shown as first iteration value 1002 that had an error of 2.21%.

Figure 11:
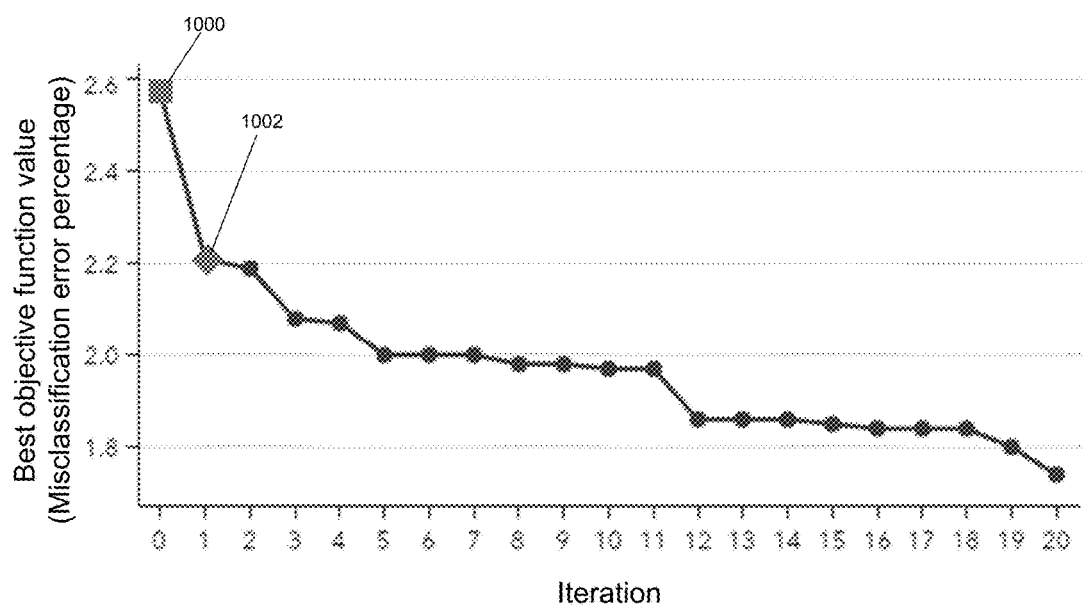
FIG. 11 shows a best objective function value computed for each iteration performed by the hyperparameter selection system of FIG. 1 in accordance with an illustrative embodiment.

Referring to FIG. 11, the results of applying the GA search method in subsequent iterations after the first iteration applied LHS are shown. Iteration 0 corresponds to default value 1000 that shows the objective function value using the default hyperparameter configuration, and iteration 1 corresponds to first iteration value 1002 that shows the best objective function value computed using the set of hyperparameter configurations defined using LHS. Subsequent symbols show the best objective value for subsequent iterations that used the GA search method to define the set of hyperparameter configurations. The error is reduced again in 11 of the remaining 19 iterations. The tuning process was terminated when the maximum requested number of iterations was reached, after evaluating 2,555 unique model configurations. Here the final error was 1.74%.

Referring to FIG. 12, a tuner results table 1200 summarizes a comparison between the default hyperparameter configuration and the ten best hyperparameter configurations of the 2,555 unique model configurations evaluated as measured by the misclassification error percentage (MISC) objective function. Evaluation number 2551 included the hyperparameter configuration with the best final error value of 1.74%. A review of tuner results table 1200 provides alternative hyperparameter configurations that have comparable objective function performance. For example, if fewer trees was desired for the number of trees hyperparameter, evaluation number 2540 may be selected by the user for selected model data 320 because the hyperparameter value selected for the number of trees hyperparameter is 136 instead of 142.

Figure 13:
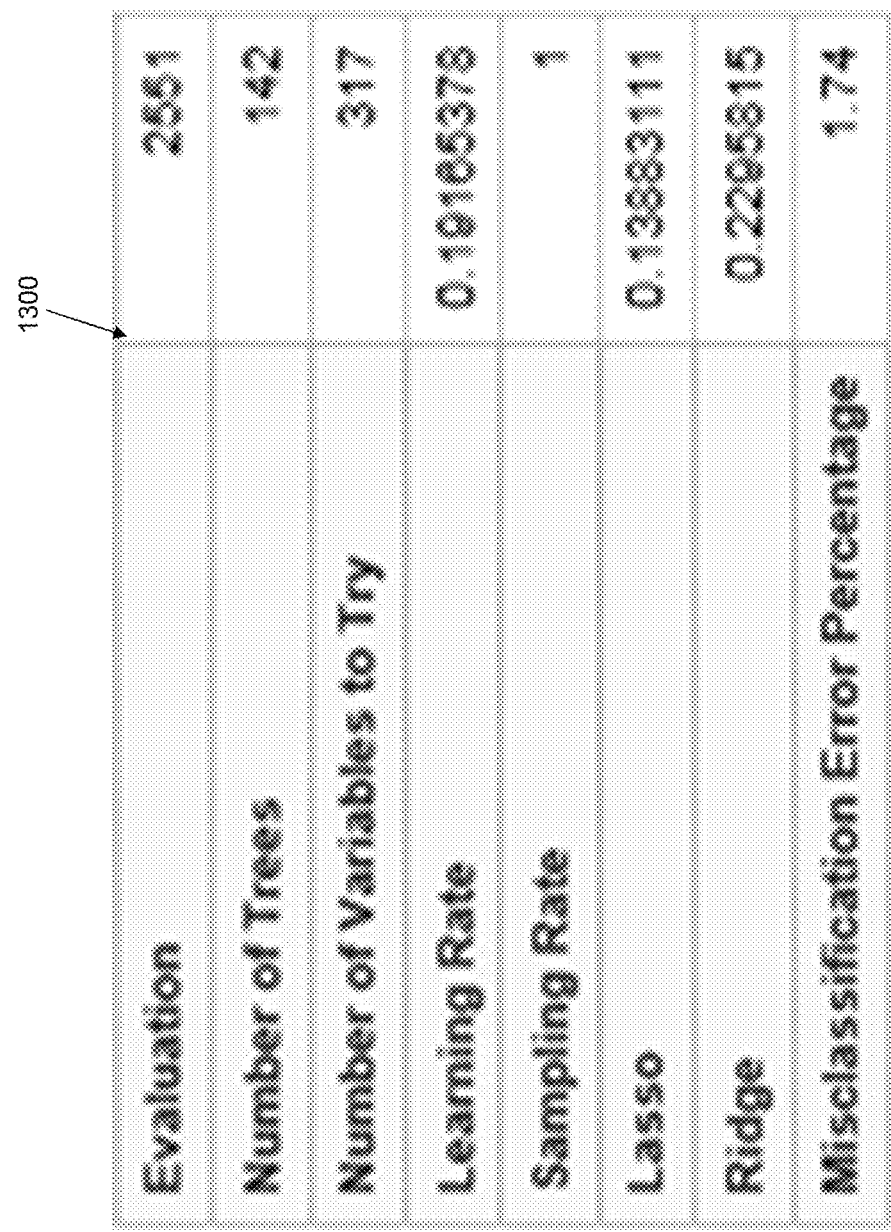
FIG. 13 shows a table of hyperparameter values for the gradient boosting tree predictive model having a best objective function value computed by the hyperparameter selection system of FIG. 1 in accordance with an illustrative embodiment.

Referring to FIG. 13, a best configuration table 1300 captures the hyperparameter configuration for the final model configuration defined by evaluation number 2551. The number of trees hyperparameter (which starts with a default of 100 trees) is driven up to 142 trees, still below the default upper bound of 150. Only 317 variables were used, well below the default of all (719) variables. The learning rate hyperparameter was increased from a default of 0.1 to 0.19, and the sampling rate hyperparameter was increased from 0.5 to 1.0, its upper bound. The L1 norm regularization hyperparameter (lasso) was increased to 0.14 from its default value of zero. The L2 norm regularization hyperparameter (ridge) was increased to 0.23 from its default value of zero.

Referring to FIG. 14, a hyperparameter configuration comparison table 1400 shows a comparison between the best, worst, and initial hyperparameter configurations.

Referring to FIG. 15, a timer table 1500 shows tuning timing information and a tuning process summary. The tuning time of just over 26 hours used more than 760 hours (2737177 seconds) of CPU time (the sum of all parallel training/scoring time for all hyperparameter configurations), which results in a parallel speed-up of nearly 28 times provided by hyperparameter selection system 100.

Figure 16:
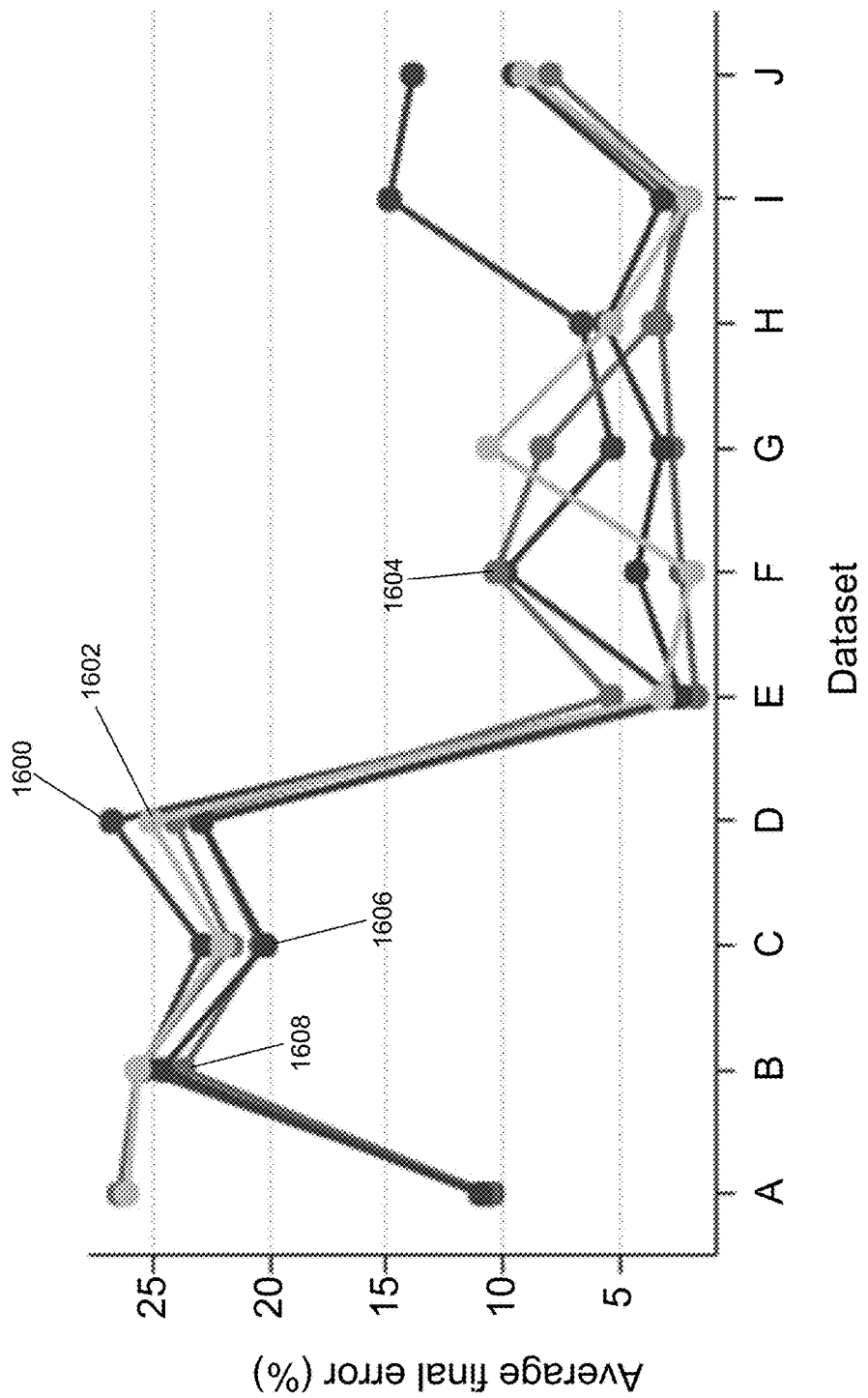
FIG. 16 shows a comparison of an average final error computed by the hyperparameter selection system of FIG. 1 for five different predictive model types and ten different input datasets in accordance with an illustrative embodiment.

Referring to FIG. 16, a final tuned model error—as averaged across ten tuning runs that used different validation partitions—for each problem and each modeling algorithm is shown for a suite of ten common machine learning test problems (A—banana dataset, B—breast cancer dataset, C—diabetes dataset, D—German dataset, E—image dataset, F—ring dataset, G—splice dataset, H—thyroid dataset, I—two norm dataset, and J—waveform dataset). The results generated using each model type are shown. Different model types generate the best results for different machine learning test problems. A first curve 1600 shows results for each dataset using the decision tree model type. A second curve 1602 shows results for each dataset using the support vector machine model type. A third curve 1604 shows results for each dataset using the neural network model type. A fourth curve 1606 shows results for each dataset using the forest model type. A fifth curve 1608 shows results for each dataset using the gradient boosting model type. For dataset A, the neural network and the support vector machine model types provided the worst results. The other four model types produced very similar errors of around 10%.

Figure 17:
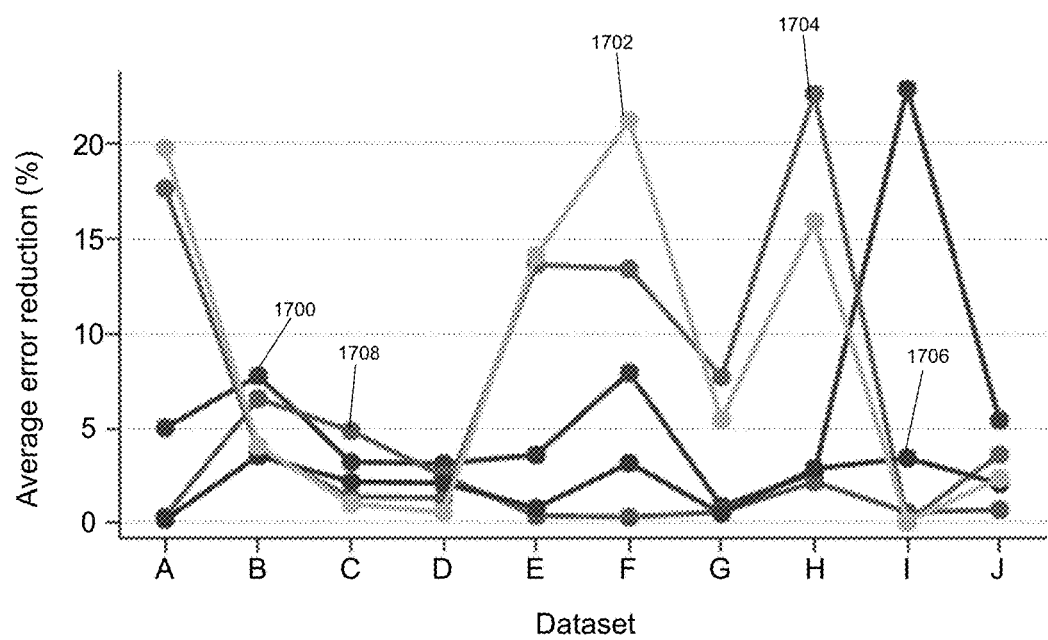
FIG. 17 shows a comparison of an average error reduction computed by the hyperparameter selection system of FIG. 1 for the five different predictive model types and the ten different input datasets in accordance with an illustrative embodiment.

Referring to FIG. 17, a model improvement (error reduction or accuracy increase where higher is better) for the suite of ten common machine learning test problems illustrated in FIG. 16 is shown. A sixth curve 1700 shows results for each dataset using the decision tree model type. A seventh curve 1702 shows results for each dataset using the support vector machine model type. An eighth curve 1704 shows results for each dataset using the neural network model type. A ninth curve 1706 shows results for each dataset using the forest model type. A tenth curve 1708 shows results for each dataset using the gradient boosting model type. Overall, the benchmark results, when averaged across all datasets, was 8.53% average improvement for the neural network model type, was 8.45% average improvement for the support vector machine model type, was 6.25% average improvement for the decision tree model type, was 2.09% average improvement for the forest model type, and was 8.45% average improvement for the gradient boosting tree model type using hyperparameter selection system 100.

Referring to FIG. 18, a block diagram of a prediction device 1800 is shown in accordance with an illustrative embodiment. Prediction device 1800 may include a fifth input interface 1802, a fifth output interface 1804, a fifth communication interface 1806, a fifth non-transitory computer-readable medium 1808, a fifth processor 1810, a prediction application 1822, selected model data 320, second dataset 1824, and predicted dataset 1826. Fewer, different, and/or additional components may be incorporated into prediction device 1800. Prediction device 1800 and user device 200 and/or selection manager device 104 may be the same or different devices.

Fifth input interface 1802 provides the same or similar functionality as that described with reference to input interface 202 of user device 200 though referring to prediction device 1800. Fifth output interface 1804 provides the same or similar functionality as that described with reference to output interface 204 of user device 200 though referring to prediction device 1800. Fifth communication interface 1806 provides the same or similar functionality as that described with reference to communication interface 206 of user device 200 though referring to prediction device 1800. Data and messages may be transferred between prediction device 1800 and a distributed computing system 1828 using fifth communication interface 1806. Fifth computer-readable medium 1808 provides the same or similar functionality as that described with reference to computer-readable medium 208 of user device 200 though referring to prediction device 1800. Fifth processor 1810 provides the same or similar functionality as that described with reference to processor 210 of user device 200 though referring to prediction device 1800.

Prediction application 1822 performs operations associated with classifying or predicting a characteristic of data stored in second dataset 1824 and/or identifying outliers in second dataset 1824 to support various data analysis functions as well as provide alert/messaging related to the classified data and/or identified outliers. Dependent on the type of data stored in the input dataset and second dataset 1824, prediction application 1822 may identify anomalies as part of process control, for example, of a manufacturing process, for machine condition monitoring, for example, an electro-cardiogram device, for image classification, for intrusion detection, for fraud detection, etc. Some or all of the operations described herein may be embodied in prediction application 1822. The operations may be implemented using hardware, firmware, software, or any combination of these methods.

Referring to the example embodiment of FIG. 18, prediction application 1822 is implemented in software (comprised of computer-readable and/or computer-executable instructions) stored in fifth computer-readable medium 1808 and accessible by fifth processor 1810 for execution of the instructions that embody the operations of prediction application 1822. Prediction application 1822 may be written using one or more programming languages, assembly languages, scripting languages, etc. Prediction application 1822 may be integrated with other analytic tools. As an example, prediction application 1822 may be part of an integrated data analytics software application and/or software architecture such as that offered by SAS Institute Inc. of Cary, N.C., USA. For example, prediction application 1822 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, prediction application 1822 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 1822 further may be performed by an ESPE. Prediction application 1822, model tuning application 222, selection manager application 312, and model train/score manager application 412 may be the same or different applications that are integrated in various manners to select hyperparameters for and execute a predictive model using the input dataset and/or second dataset 1824 in a single computing device or a plurality of distributed computing devices.

Prediction application 1822 may be implemented as a Web application. Prediction application 1822 may be integrated with other system processing tools to automatically process data generated as part of operation of an enterprise, to classify data in the processed data, to identify any outliers in the processed data, and/or to provide a warning or alert associated with the data classification and/or outlier identification using fifth input interface 1802, fifth output interface 1804, and/or fifth communication interface 1806 so that appropriate action can be initiated in response. For example, a warning or an alert may be presented using a second display 1816, a second speaker 1818, a second printer 1820, etc. or sent to one or more computer-readable media, display, speaker, printer, etc. of distributed computing system 1828.

The input dataset and second dataset 1824 may be generated, stored, and accessed using the same or different mechanisms. Similar to the input dataset, second dataset 1824 may include a plurality of rows and a plurality of columns with the plurality of rows referred to as observations or records, and the columns referred to as variables that are associated with an observation. Second dataset 1824 may be transposed.

Similar to the input dataset, second dataset 1824 may be stored on fifth computer-readable medium 1808 or on one or more computer-readable media of distributed computing system 1828 and accessed by prediction device 1800 using fifth communication interface 1806. Data stored in second dataset 1824 may be a sensor measurement or a data communication value, for example, from a sensor 1813, may be generated or captured in response to occurrence of an event or a transaction, generated by a device such as in response to an interaction by a user with the device, for example, from a second keyboard 1812 or a second mouse 1814, etc. The data stored in second dataset 1824 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 1824 may be captured at different time points periodically, intermittently, when an event occurs, etc. One or more columns may include a time value. Similar to the input dataset, data stored in second dataset 1824 may be generated as part of the IoT, and some or all data may be pre- or post-processed by an ESPE.

Similar to the input dataset, second dataset 1824 may be stored in various compressed formats such as a coordinate format, a compressed sparse column format, a compressed sparse row format, etc. Second dataset 1824 further may be stored using various structures as known to those skilled in the art including a file system, a relational database, a system of tables, a structured query language database, etc. on prediction device 1800 and/or on distributed computing system 1828. Prediction device 1800 and/or distributed computing system 1828 may coordinate access to second dataset 1824 that is distributed across a plurality of computing devices. For example, second dataset 1824 may be stored in a cube distributed across a grid of computers as understood by a person of skill in the art. As another example, second dataset 1824 may be stored in a multi-node Hadoop® cluster. As another example, second dataset 1824 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 1824.

Figure 19:
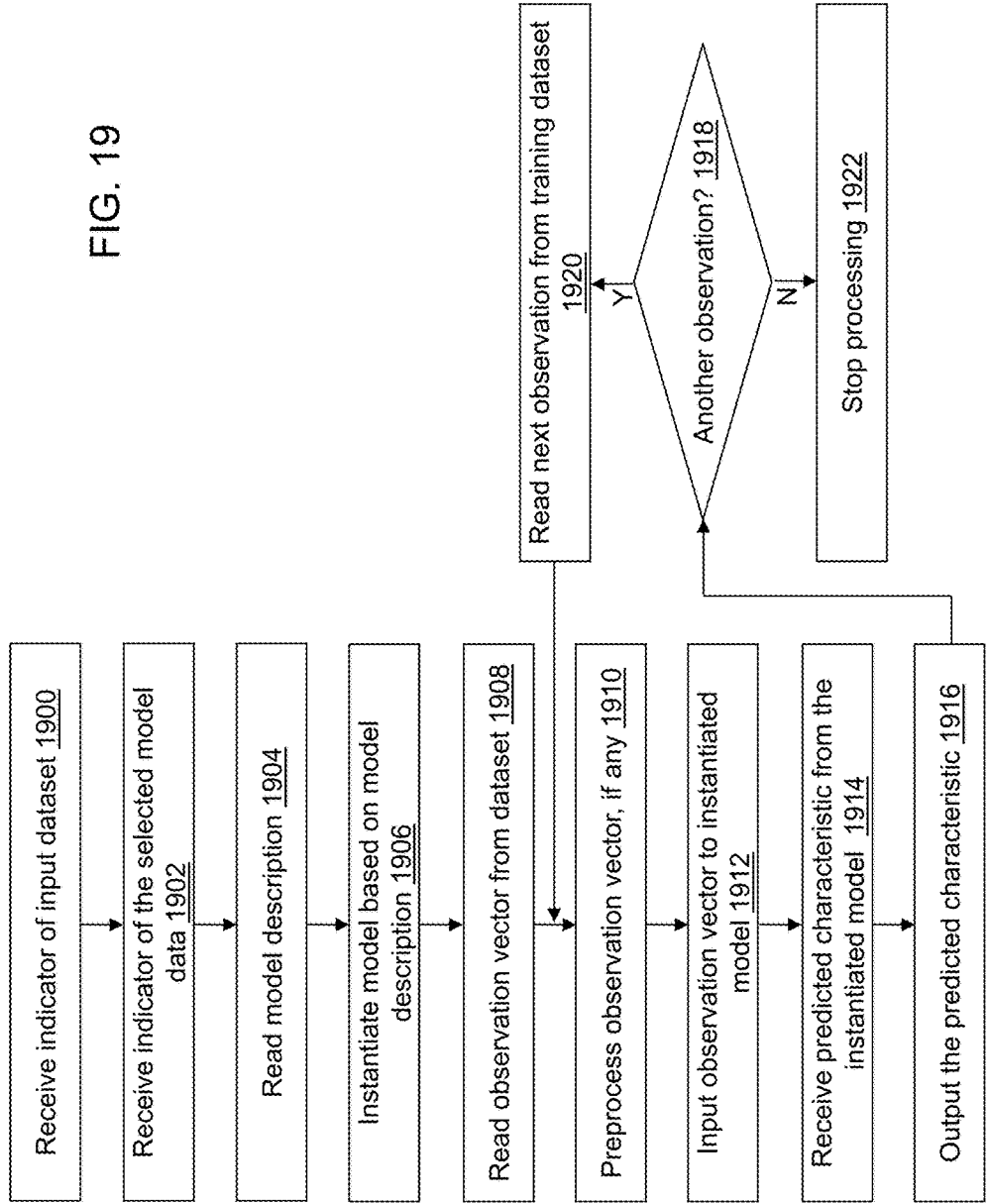
FIG. 19 depicts a flow diagram illustrating examples of operations performed by the prediction device of FIG. 18 in accordance with an illustrative embodiment.

Referring to FIG. 19, example operations of prediction application 1822 are described. Additional, fewer, or different operations may be performed depending on the embodiment of prediction application 1822. The order of presentation of the operations of FIG. 19 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1900, a fourteenth indicator may be received that indicates second dataset 1824. For example, the fourteenth indicator indicates a location and a name of second dataset 1824. As an example, the fourteenth indicator may be received by prediction application 1822 after selection from a user interface window or after entry by a user into a user interface window. In an alternative embodiment, second dataset 1824 may not be selectable. For example, a most recently created dataset may be used automatically. As another example, second dataset 1824 may be provided automatically as part of integration with model tuning application 222, selection manager application 312, and/or model train/score manager application 412.

In an operation 1902, a fifteenth indicator may be received that indicates selected model data 320. For example, the fifteenth indicator indicates a location and a name of selected model data 320. As an example, the fifteenth indicator may be received by prediction application 1822 after selection from a user interface window or after entry by a user into a user interface window. In an alternative embodiment, selected model data 320 may not be selectable. For example, most recently created model data may be used automatically. As another example, selected model data 320 may be provided automatically as part of integration with model tuning application 222, selection manager application 312, and/or model train/score manager application 412.

In an operation 1904, a model description is read from selected model data 320.

In an operation 1906, a model is instantiated with information read from the model description. For example, the type of model, its hyperparameter values, and other characterizing elements are read and used to instantiate the model.

In an operation 1908, an observation vector is read from second dataset 1824.

In an operation 1910, the observation vector is pre-processed, if any, pre-processing is performed.

In an operation 1912, the optionally pre-processed observation vector is input to the instantiated model.

In an operation 1914, an output of the instantiated model is received. The output may indicate a predicted characteristic of the observation vector.

In an operation 1916, the predicted characteristic may be output, for example, by storing the predicted characteristic with the observation vector to predicted dataset 1826. In addition, or in the alternative, the predicted characteristic may be presented on second display 1816, printed on second printer 1820, a message including the predicted characteristic may be sent to another computing device using fifth communication interface 1806, an alarm or other alert signal may be sounded through second speaker 1818, etc.

In an operation 1918, a determination is made concerning whether or not second dataset 1824 includes another observation vector. When second dataset 1824 includes another observation vector, processing continues in an operation 1920. When second dataset 1824 does not include another observation vector, processing continues in an operation 1920.

In operation 1920, a next observation vector is read from second dataset 1824, and processing continues in operation 1910.

In operation 1922, processing stops and cleanup is performed as needed.

There are applications for model tuning application 222, selection manager application 312, model train/score manager application 412, and/or prediction application 1822 in many areas such as process control and equipment health monitoring, image processing and classification, data segmentation, data analysis, etc. Model tuning application 222, selection manager application 312, and model train/score manager application 412 automatically tune hyperparameters of modeling algorithms that include decision tree models, forest models, gradient boosting models, neural network models, support vector machine models, factorization machine models, etc. Given the inherent expense of training numerous candidate models, model tuning application 222, selection manager application 312, model train/score manager application 412, and model train/score worker application 432 provide efficient distributed and parallel computing device implementations for training and tuning models. The presented results demonstrate the improved model accuracies and the improved execution times.

The explosion of digital data is generating many opportunities for big data analytics, which in turn provides many opportunities for tuning predictive models to capitalize on the information contained in the data—to make better predictions that lead to better decisions. Hyperparameter selection system 100 supports better decision making by providing a system that can identify and evaluate many more hyperparameter configurations in parallel by allocating the computing devices of worker system 106 in an effective data and model parallel manner.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a first computing device cause the first computing device to:

access a plurality of tuning evaluation parameters, wherein the plurality of tuning evaluation parameters include a model type, a search method type, and values to evaluate for each hyperparameter of a plurality of hyperparameters associated with the model type;

determine a number of session computing devices allocated to each session of a plurality of sessions, wherein each session computing device of the number of session computing devices processes a subset of an input dataset, wherein the number of session computing devices is determined based on a number of rows and a number of columns of the input dataset;
determine a number of the plurality of sessions, wherein each session of the plurality of sessions executes training and scoring of the model type using the input dataset in parallel with other sessions of the plurality of sessions, wherein the number of the plurality of sessions is determined based on the search method type;
determine a plurality of hyperparameter configurations using a search method of the search method type, wherein a hyperparameter configuration includes a value for each hyperparameter of the plurality of hyperparameters, wherein each hyperparameter configuration of the plurality of hyperparameter configurations is unique;
for each session of the plurality of sessions,
assign a hyperparameter configuration to the session of the plurality of sessions;
request training of a model of the model type by the session computing devices allocated to the session, wherein the model is trained using the assigned hyperparameter configuration and a training dataset that is a first portion of the input dataset;
request scoring of the trained model by the session computing devices allocated to the session to compute an objective function value, wherein the trained model is scored using the assigned hyperparameter configuration and a validation dataset that is a second portion of the input dataset;
receive the computed objective function value when the requested scoring is complete; and
store the received objective function value and the assigned hyperparameter configuration;
identify a best hyperparameter configuration based on an extreme value of the stored objective function values; and
output the identified best hyperparameter configuration.

2. The non-transitory computer-readable medium of claim 1, wherein before receiving the computed objective function value, the computer-readable instructions further cause the first computing device to receive an indicator from the session that the scoring is complete.

3. The non-transitory computer-readable medium of claim 2, wherein when the requested scoring is complete and before identifying the best hyperparameter configuration, the computer-readable instructions further cause the first computing device to:
(a) determine if the determined plurality of hyperparameter configurations includes another hyperparameter configuration that has not been assigned;
(b) when the determined plurality of hyperparameter configurations includes another hyperparameter configuration that has not been assigned,
assign the another hyperparameter configuration to the session from which the indicator was received;
request training of the model of the model type by the session computing devices allocated to the session from which the indicator was received, wherein the model is trained using the training dataset and the assigned another hyperparameter configuration;
request scoring of the trained model by the session computing devices allocated to the session from which the indicator was received to compute another objective function value using the validation dataset and the assigned another hyperparameter configuration;
receive the computed another objective function value when the requested scoring is complete by the session computing devices allocated to the session from which the indicator was received; and
store the received another objective function value and the assigned another hyperparameter configuration; and
repeat (a) and (b) until all of the determined plurality of hyperparameter configurations have been assigned.

4. The non-transitory computer-readable medium of claim 3, wherein the best hyperparameter configuration is identified after storing the received another objective function value and the assigned another hyperparameter configuration for all of the determined plurality of hyperparameter configurations.

5. The non-transitory computer-readable medium of claim 3, wherein after storing the received another objective function value and the assigned another hyperparameter configuration for all of the determined plurality of hyperparameter configurations and before identifying the best hyperparameter configuration, the computer-readable instructions further cause the first computing device to:
determine a second plurality of hyperparameter configurations using a second search method of a second search method type included in the tuning evaluation parameters, wherein each hyperparameter configuration of the second plurality of hyperparameter configurations is unique;
for each session of the plurality of sessions,
assign a second hyperparameter configuration to the session of the plurality of sessions;
request second training of a second model of the model type by the session computing devices allocated to the session, wherein the second model is trained using the training dataset and the assigned second hyperparameter configuration;
request second scoring of the trained second model by the session computing devices allocated to the session to compute a second objective function value, wherein the trained second model is scored using the validation dataset and the assigned second hyperparameter configuration;
receive the computed second objective function value when the requested second scoring is complete; and
store the received second objective function value and the assigned second hyperparameter configuration.

6. The non-transitory computer-readable medium of claim 5, wherein the search method type is different from the second search method type.

7. The non-transitory computer-readable medium of claim 5, wherein the second search method type is one of a plurality of search method types included in the tuning evaluation parameters, wherein the second plurality of hyperparameter configurations are determined using a second search method associated with each search method type of the plurality of search method types.

8. The non-transitory computer-readable medium of claim 5, wherein each received objective function value, each assigned hyperparameter configuration, each received another objective function value, and each assigned another hyperparameter configuration are stored in an evaluation cache.

9. The non-transitory computer-readable medium of claim 8, wherein before assigning the second hyperparameter configuration, the computer-readable instructions further cause the first computing device to remove any hyperparameter configuration from the determined second plurality of hyperparameter configurations that is within a predefined cache tolerance value of any hyperparameter configuration stored in the evaluation cache.

10. The non-transitory computer-readable medium of claim 1, wherein before determining the plurality of hyperparameter configurations, the computer-readable instructions further cause the first computing device to:
define a baseline hyperparameter configuration;
select a baseline session from the plurality of sessions;
assign the defined baseline hyperparameter configuration to the selected baseline session;
request training of a baseline model of the model type by the selected baseline session, wherein the baseline model is trained using the training dataset and the assigned baseline hyperparameter configuration;
request scoring of the trained baseline model by the selected baseline session to compute a baseline objective function value, wherein the trained baseline model is scored using the validation dataset and the assigned baseline hyperparameter configuration;
receive the computed baseline objective function value when the requested scoring of the trained baseline model is complete; and
store the received baseline objective function value and the assigned baseline hyperparameter configuration,
wherein determining the plurality of hyperparameter configurations further uses the received baseline objective function value.

11. The non-transitory computer-readable medium of claim 1, wherein the search method type is one of a plurality of search method types included in the tuning evaluation parameters, wherein the plurality of hyperparameter configurations are determined using a search method associated with each search method type of the plurality of search method types.

12. The non-transitory computer-readable medium of claim 1, wherein the objective function value is a measure of model error of the trained model.

13. A non-transitory computer-readable medium having stored thereon computer-readable instructions that when executed by a first computing device cause the first computing device to:
access a plurality of tuning evaluation parameters, wherein the plurality of tuning evaluation parameters include a model type, a search method type, and values to evaluate for each hyperparameter of a plurality of hyperparameters associated with the model type;
determine a number of session computing devices allocated to each session of a plurality of sessions, wherein each session computing device of the number of session computing devices processes a subset of an input dataset;
determine a number of the plurality of sessions, wherein each session of the plurality of sessions executes training and scoring of the model type using the input dataset in parallel with other sessions of the plurality of sessions, wherein the number of the plurality of sessions is determined based on the search method type;
determine a plurality of hyperparameter configurations using a search method of the search method type, wherein a hyperparameter configuration includes a value for each hyperparameter of the plurality of hyperparameters, wherein each hyperparameter configuration of the plurality of hyperparameter configurations is unique;
for each session of the plurality of sessions,
assign a hyperparameter configuration to the session of the plurality of sessions;
request training of a model of the model type by the session computing devices allocated to the session, wherein the model is trained using the assigned hyperparameter configuration and a training dataset that is a first portion of the input dataset;
request scoring of the trained model by the session computing devices allocated to the session to compute an objective function value, wherein the trained model is scored using the assigned hyperparameter configuration and a validation dataset that is a second portion of the input dataset;
receive the computed objective function value when the requested scoring is complete; and
store the received objective function value and the assigned hyperparameter configuration;
identify a best hyperparameter configuration based on an extreme value of the stored objective function values; and
output the identified best hyperparameter configuration.

14. The non-transitory computer-readable medium of claim 13, wherein the number of the plurality of sessions is determined based on a population size of the search method type or a sample size of the search method type.

15. The non-transitory computer-readable medium of claim 14, wherein when the search method type is a generating set search, twice a number of the hyperparameters of the plurality of hyperparameters associated with the model type is added to the number of the plurality of sessions determined based on the population size or the sample size.

16. The non-transitory computer-readable medium of claim 13, wherein the number of the plurality of sessions determined based on the search method type is limited by a total number of worker computing devices divided by the determined number of session computing devices, wherein each worker computing device of the total number of worker computing devices is in communication with and controllable by the first computing device to participate in at least one session of the plurality of sessions.

17. A non-transitory computer-readable medium having stored thereon computer-readable instructions that when executed by a first computing device cause the first computing device to:
access a plurality of tuning evaluation parameters, wherein the plurality of tuning evaluation parameters include a model type, a search method type, and values to evaluate for each hyperparameter of a plurality of hyperparameters associated with the model type;
determine a number of session computing devices allocated to each session of a plurality of sessions, wherein each session computing device of the number of session computing devices processes a subset of an input dataset;
determine a number of the plurality of sessions, wherein each session of the plurality of sessions executes training and scoring of the model type using the input dataset in parallel with other sessions of the plurality of sessions, wherein the number of the plurality of sessions is determined based on the search method type, wherein the number of the plurality of sessions is further determined based on a total number of worker computing devices divided by the determined number of session computing devices, wherein each worker computing device of the total number of worker computing devices is in communication with and controllable by the first computing device to participate in at least one session of the plurality of sessions;

determine a plurality of hyperparameter configurations using a search method of the search method type, wherein a hyperparameter configuration includes a value for each hyperparameter of the plurality of hyperparameters, wherein each hyperparameter configuration of the plurality of hyperparameter configurations is unique;

for each session of the plurality of sessions,
assign a hyperparameter configuration to the session of the plurality of sessions;
request training of a model of the model type by the session computing devices allocated to the session, wherein the model is trained using the assigned hyperparameter configuration and a training dataset that is a first portion of the input dataset;
request scoring of the trained model by the session computing devices allocated to the session to compute an objective function value, wherein the trained model is scored using the assigned hyperparameter configuration and a validation dataset that is a second portion of the input dataset;
receive the computed objective function value when the requested scoring is complete; and
store the received objective function value and the assigned hyperparameter configuration;
identify a best hyperparameter configuration based on an extreme value of the stored objective function values; and
output the identified best hyperparameter configuration.

18. The non-transitory computer-readable medium of claim 1, wherein the model type is selected from the group consisting of a decision tree model type, a factorization machine model type, a forest model type, a gradient boosting tree model type, a neural network model type, and a support vector machine model type.

19. The non-transitory computer-readable medium of claim 1, wherein the search method type is one or more of a grid search method, a random search method, a Latin hypercube sampling search method, a genetic algorithm search method, a generating set search method, a Bayesian search method, a DIRECT search method, and a Nelder-Mead simplex search method.

20. The non-transitory computer-readable medium of claim 1, wherein the computer-readable instructions further cause the first computing device to:
select a final session from the plurality of sessions;
assign the identified best hyperparameter configuration to the selected final session;
request training of a final model of the model type by the selected final session, wherein the final model is trained using the training dataset and the identified best hyperparameter configuration;
receive the trained final model; and
store the received final model.

21. The non-transitory computer-readable medium of claim 20, wherein the computer-readable instructions further cause the computing device to:
read an observation vector from a second dataset;
instantiate a prediction model from the stored final model;
compute a predicted characteristic of the read observation vector using the instantiated prediction model; and
output the computed predicted characteristic of the read observation vector.

22. The non-transitory computer-readable medium of claim 1, wherein before determining the plurality of hyperparameter configurations, a thread of the first computing device is allocated to each session to control communication of the plurality of tuning evaluation parameters, of each request, and of the computed objective function value.

23. A computing device comprising:
a processor; and
a computer-readable medium operably coupled to the processor, the computer-readable medium having computer-readable instructions stored thereon that, when executed by the processor, cause the computing device to
access a plurality of tuning evaluation parameters, wherein the plurality of tuning evaluation parameters include a model type, a search method type, and values to evaluate for each hyperparameter of a plurality of hyperparameters associated with the model type;
determine a number of session computing devices allocated to each session of a plurality of sessions, wherein each session computing device of the number of session computing devices processes a subset of an input dataset, wherein the number of session computing devices is determined based on a number of rows and a number of columns of the input dataset;
determine a number of the plurality of sessions, wherein each session of the plurality of sessions executes training and scoring of the model type using the input dataset in parallel with other sessions of the plurality of sessions, wherein the number of the plurality of sessions is determined based on the search method type;
determine a plurality of hyperparameter configurations using a search method of the search method type, wherein a hyperparameter configuration includes a value for each hyperparameter of the plurality of hyperparameters, wherein each hyperparameter configuration of the plurality of hyperparameter configurations is unique;
for each session of the plurality of sessions,
assign a hyperparameter configuration to the session of the plurality of sessions;
request training of a model of the model type by the session computing devices allocated to the session, wherein the model is trained using the assigned hyperparameter configuration and a training dataset that is a first portion of the input dataset;
request scoring of the trained model by the session computing devices allocated to the session to compute an objective function value, wherein the trained model is scored using the assigned hyperparameter configuration and a validation dataset that is a second portion of the input dataset;
receive the computed objective function value when the requested scoring is complete; and
store the received objective function value and the assigned hyperparameter configuration;
identify a best hyperparameter configuration based on an extreme value of the stored objective function values; and
output the identified best hyperparameter configuration.

24. A method of automatically selecting hyperparameter values based on objective criteria to train a predictive model, the method comprising:

accessing, by a computing device, a plurality of tuning evaluation parameters, wherein the plurality of tuning evaluation parameters include a model type, a search method type, and values to evaluate for each hyperparameter of a plurality of hyperparameters associated with the model type;

determining, by the computing device, a number of session computing devices allocated to each session of a plurality of sessions, wherein each session computing device of the number of session computing devices processes a subset of an input dataset, wherein the number of session computing devices is determined based on a number of rows and a number of columns of the input dataset;

determining, by the computing device, a number of the plurality of sessions, wherein each session of the plurality of sessions executes training and scoring of the model type using the input dataset in parallel with other sessions of the plurality of sessions, wherein the number of the plurality of sessions is determined based on the search method type;

determining, by the computing device, a plurality of hyperparameter configurations using a search method of the search method type, wherein a hyperparameter configuration includes a value for each hyperparameter of the plurality of hyperparameters, wherein each hyperparameter configuration of the plurality of hyperparameter configurations is unique;

for each session of the plurality of sessions,
assigning, by the computing device, a hyperparameter configuration to the session of the plurality of sessions;
requesting, by the computing device, training of a model of the model type by the session computing devices allocated to the session, wherein the model is trained using the assigned hyperparameter configuration and a training dataset that is a first portion of the input dataset;
requesting, by the computing device, scoring of the trained model by the session computing devices allocated to the session to compute an objective function value, wherein the trained model is scored using the assigned hyperparameter configuration and a validation dataset that is a second portion of the input dataset;
receiving the computed objective function value when the requested scoring is complete; and
storing, by the computing device, the received objective function value and the assigned hyperparameter configuration;

identifying, by the computing device, a best hyperparameter configuration based on an extreme value of the stored objective function values; and
outputting, by the computing device, the identified best hyperparameter configuration.

25. The method of claim 24, wherein the search method type is one of a plurality of search method types included in the tuning evaluation parameters, wherein the plurality of hyperparameter configurations are determined using a search method associated with each search method type of the plurality of search method types.

26. The method of claim 24, wherein the number of the plurality of sessions is determined based on a population size of the search method type or a sample size of the search method type.

27. A computing device comprising:
a processor; and
a computer-readable medium operably coupled to the processor, the computer-readable medium having computer-readable instructions stored thereon that, when executed by the processor, cause the computing device to
access a plurality of tuning evaluation parameters, wherein the plurality of tuning evaluation parameters include a model type, a search method type, and values to evaluate for each hyperparameter of a plurality of hyperparameters associated with the model type;
determine a number of session computing devices allocated to each session of a plurality of sessions, wherein each session computing device of the number of session computing devices processes a subset of an input dataset;
determine a number of the plurality of sessions, wherein each session of the plurality of sessions executes training and scoring of the model type using the input dataset in parallel with other sessions of the plurality of sessions, wherein the number of the plurality of sessions is determined based on the search method type;
determine a plurality of hyperparameter configurations using a search method of the search method type, wherein a hyperparameter configuration includes a value for each hyperparameter of the plurality of hyperparameters, wherein each hyperparameter configuration of the plurality of hyperparameter configurations is unique;
for each session of the plurality of sessions,
assign a hyperparameter configuration to the session of the plurality of sessions;
request training of a model of the model type by the session computing devices allocated to the session, wherein the model is trained using the assigned hyperparameter configuration and a training dataset that is a first portion of the input dataset;
request scoring of the trained model by the session computing devices allocated to the session to compute an objective function value, wherein the trained model is scored using the assigned hyperparameter configuration and a validation dataset that is a second portion of the input dataset;
receive the computed objective function value when the requested scoring is complete; and
store the received objective function value and the assigned hyperparameter configuration;
identify a best hyperparameter configuration based on an extreme value of the stored objective function values; and
output the identified best hyperparameter configuration.

28. A computing device comprising:
a processor; and
a computer-readable medium operably coupled to the processor, the computer-readable medium having computer-readable instructions stored thereon that, when executed by the processor, cause the computing device to access a plurality of tuning evaluation parameters, wherein the plurality of tuning evaluation parameters include a model type, a search method type, and values to evaluate for each hyperparameter of a plurality of hyperparameters associated with the model type;

determine a number of session computing devices allocated to each session of a plurality of sessions, wherein each session computing device of the number of session computing devices processes a subset of an input dataset;

determine a number of the plurality of sessions, wherein each session of the plurality of sessions executes training and scoring of the model type using the input dataset in parallel with other sessions of the plurality of sessions, wherein the number of the plurality of sessions is determined based on the search method type, wherein the number of the plurality of sessions is further determined based on a total number of worker computing devices divided by the determined number of session computing devices, wherein each worker computing device of the total number of worker computing devices is in communication with and controllable by the first computing device to participate in at least one session of the plurality of sessions;

determine a plurality of hyperparameter configurations using a search method of the search method type, wherein a hyperparameter configuration includes a value for each hyperparameter of the plurality of hyperparameters, wherein each hyperparameter configuration of the plurality of hyperparameter configurations is unique;

for each session of the plurality of sessions,
assign a hyperparameter configuration to the session of the plurality of sessions;
request training of a model of the model type by the session computing devices allocated to the session, wherein the model is trained using the assigned hyperparameter configuration and a training dataset that is a first portion of the input dataset;
request scoring of the trained model by the session computing devices allocated to the session to compute an objective function value, wherein the trained model is scored using the assigned hyperparameter configuration and a validation dataset that is a second portion of the input dataset;
receive the computed objective function value when the requested scoring is complete; and
store the received objective function value and the assigned hyperparameter configuration;
identify a best hyperparameter configuration based on an extreme value of the stored objective function values; and
output the identified best hyperparameter configuration.

29. A method of automatically selecting hyperparameter values based on objective criteria to train a predictive model, the method comprising:

accessing, by a computing device, a plurality of tuning evaluation parameters, wherein the plurality of tuning evaluation parameters include a model type, a search method type, and values to evaluate for each hyperparameter of a plurality of hyperparameters associated with the model type;

determining, by the computing device, a number of session computing devices allocated to each session of a plurality of sessions, wherein each session computing device of the number of session computing devices processes a subset of an input dataset;

determining, by the computing device, a number of the plurality of sessions, wherein each session of the plurality of sessions executes training and scoring of the model type using the input dataset in parallel with other sessions of the plurality of sessions, wherein the number of the plurality of sessions is determined based on the search method type;

determining, by the computing device, a plurality of hyperparameter configurations using a search method of the search method type, wherein a hyperparameter configuration includes a value for each hyperparameter of the plurality of hyperparameters, wherein each hyperparameter configuration of the plurality of hyperparameter configurations is unique;

for each session of the plurality of sessions,
assigning, by the computing device, a hyperparameter configuration to the session of the plurality of sessions;
requesting, by the computing device, training of a model of the model type by the session computing devices allocated to the session, wherein the model is trained using the assigned hyperparameter configuration and a training dataset that is a first portion of the input dataset;
requesting, by the computing device, scoring of the trained model by the session computing devices allocated to the session to compute an objective function value, wherein the trained model is scored using the assigned hyperparameter configuration and a validation dataset that is a second portion of the input dataset;
receiving the computed objective function value when the requested scoring is complete; and
storing, by the computing device, the received objective function value and the assigned hyperparameter configuration;
identifying, by the computing device, a best hyperparameter configuration based on an extreme value of the stored objective function values; and
outputting, by the computing device, the identified best hyperparameter configuration.

30. A method of automatically selecting hyperparameter values based on objective criteria to train a predictive model, the method comprising:

accessing, by a computing device, a plurality of tuning evaluation parameters, wherein the plurality of tuning evaluation parameters include a model type, a search method type, and values to evaluate for each hyperparameter of a plurality of hyperparameters associated with the model type;

determining, by the computing device, a number of session computing devices allocated to each session of a plurality of sessions, wherein each session computing device of the number of session computing devices processes a subset of an input dataset;

determining, by the computing device, a number of the plurality of sessions, wherein each session of the plurality of sessions executes training and scoring of the model type using the input dataset in parallel with other sessions of the plurality of sessions, wherein the number of the plurality of sessions is determined based on the search method type, wherein the number of the plurality of sessions is further determined based on a total number of worker computing devices divided by the determined number of session computing devices, wherein each worker computing device of the total number of worker computing devices is in communication with and controllable by the first computing device to participate in at least one session of the plurality of sessions;

determining, by the computing device, a plurality of hyperparameter configurations using a search method of the search method type, wherein a hyperparameter configuration includes a value for each hyperparameter of the plurality of hyperparameters, wherein each hyperparameter configuration of the plurality of hyperparameter configurations is unique;

for each session of the plurality of sessions,
  assigning, by the computing device, a hyperparameter configuration to the session of the plurality of sessions;
  requesting, by the computing device, training of a model of the model type by the session computing devices allocated to the session, wherein the model is trained using the assigned hyperparameter configuration and a training dataset that is a first portion of the input dataset;
  requesting, by the computing device, scoring of the trained model by the session computing devices allocated to the session to compute an objective function value, wherein the trained model is scored using the assigned hyperparameter configuration and a validation dataset that is a second portion of the input dataset;
  receiving the computed objective function value when the requested scoring is complete; and
  storing, by the computing device, the received objective function value and the assigned hyperparameter configuration;

identifying, by the computing device, a best hyperparameter configuration based on an extreme value of the stored objective function values; and outputting, by the computing device, the identified best hyperparameter configuration.

\* \* \* \* \*

UNITED STATES PATENT AND TRADEMARK OFFICE
CERTIFICATE OF CORRECTION

PATENT NO. : 10,360,517 B2  
APPLICATION NO. : 15/822462  
DATED : July 23, 2019  
INVENTOR(S) : Patrick Nathan Koch et al.

Page 1 of 1

It is certified that error appears in the above-identified patent and that said Letters Patent is hereby corrected as shown below:

In the Specification

Column 22, Line 37:

Delete the phrase "$\omega_1$ is a frequency of observation $i$, so $N = \sum_{i=1}^{n_o} \omega_i$," and replace with --$\omega_i$ is a frequency of observation $i$, so $N = \sum_{i=1}^{n_o} \omega_i$,--.

Column 22, Lines 51-53:

Delete the phrase "$\theta = \sum_{k=1}^{m_{tc}}(a_{k-1} - a_k)(b_{k-1} - b_k)$, $\mu = \sum_{k=2}^{m_{tc}}((a_{k-1} - a_k)\sum_{j=1}^{k}(b_{j-1} - b_j))$, $w = \sum_{k=2}^{m_{tc}}((a_{k-1} - a_k)\sum_{k=2}^{m_{tc}}(b_{j-1} - b_j))$" and replace with -- $\theta = \sum_{k=1}^{m_{tc}}(a_{k-1} - a_k)(b_{k-1} - b_k)$,  
$\mu = \sum_{k=2}^{m_{tc}}((a_{k-1} - a_k)\sum_{j=1}^{k}(b_{j-1} - b_j))$,  
$w = \sum_{k=1}^{m_{tc}}((a_{k-1} - a_k)\sum_{j=k+1}^{m_{tc}}(b_{j-1} - b_j))$, --.

Signed and Sealed this  
Twenty-ninth Day of October, 2019

Andrei Iancu  
*Director of the United States Patent and Trademark Office*